US011970968B1

(12) United States Patent
Farrukh

(10) Patent No.: US 11,970,968 B1
(45) Date of Patent: Apr. 30, 2024

(54) MHMF ALTERNATING INTERNAL COMBUSTION ENGINE

(71) Applicant: Muhammad Hashier Muneeb Farrukh, Islamabad (PK)

(72) Inventor: Muhammad Hashier Muneeb Farrukh, Islamabad (PK)

( * ) Notice: Subject to any disclaimer, the term of this patent is extended or adjusted under 35 U.S.C. 154(b) by 0 days.

(21) Appl. No.: 18/179,624

(22) Filed: Mar. 7, 2023

Related U.S. Application Data

(60) Provisional application No. 63/484,484, filed on Feb. 11, 2023.

(51) Int. Cl.

| | |
|---|---|
| ***F02B 75/20*** | (2006.01) |
| ***F02B 75/00*** | (2006.01) |
| ***F02F 3/28*** | (2006.01) |

(52) U.S. Cl.
CPC ............ *F02B 75/002* (2013.01); *F02B 75/20* (2013.01); *F02F 3/28* (2013.01)

(58) Field of Classification Search
CPC ...... F02B 75/002; F02B 75/282; F02B 75/28; F02B 75/32; F01B 7/16; F04B 25/005
USPC .......................................................... 123/58.1
See application file for complete search history.

(56) References Cited

U.S. PATENT DOCUMENTS

| | | | | |
|---|---|---|---|---|
| 2,317,167 A * | 4/1943 | Baer | F02B 75/002 123/63 |
| 8,967,098 B2 * | 3/2015 | Khurgin | F02B 71/00 123/61 R |
| 2004/0099229 A1 * | 5/2004 | Gelfand | F02B 75/282 123/63 |
| 2014/0265349 A1 * | 9/2014 | Morreim | F02B 63/041 417/364 |
| 2018/0252105 A1 * | 9/2018 | Gaj-Jablonski | F01B 1/08 |

* cited by examiner

*Primary Examiner* — Long T Tran
*Assistant Examiner* — James J Kim
(74) *Attorney, Agent, or Firm* — Muhammad Hashier Muneeb Farrukh

(57) ABSTRACT

MHMF Alternating Internal Combustion Engine consists of a double sided piston dividing the cylinder in two regions. Both regions are functional in alternative manner. This design includes more than one cylinder. The power strokes from both regions of the main cylinder also aid the processes in both regions of supplementary cylinder. The formulated Pressure-Volume (PV) relationship between the regions of a cylinder demonstrates the operation of one region supplementing the operation in the other region. This design leads to weight reduction, reduction of power losses thus enhancing efficiency.

12 Claims, 29 Drawing Sheets

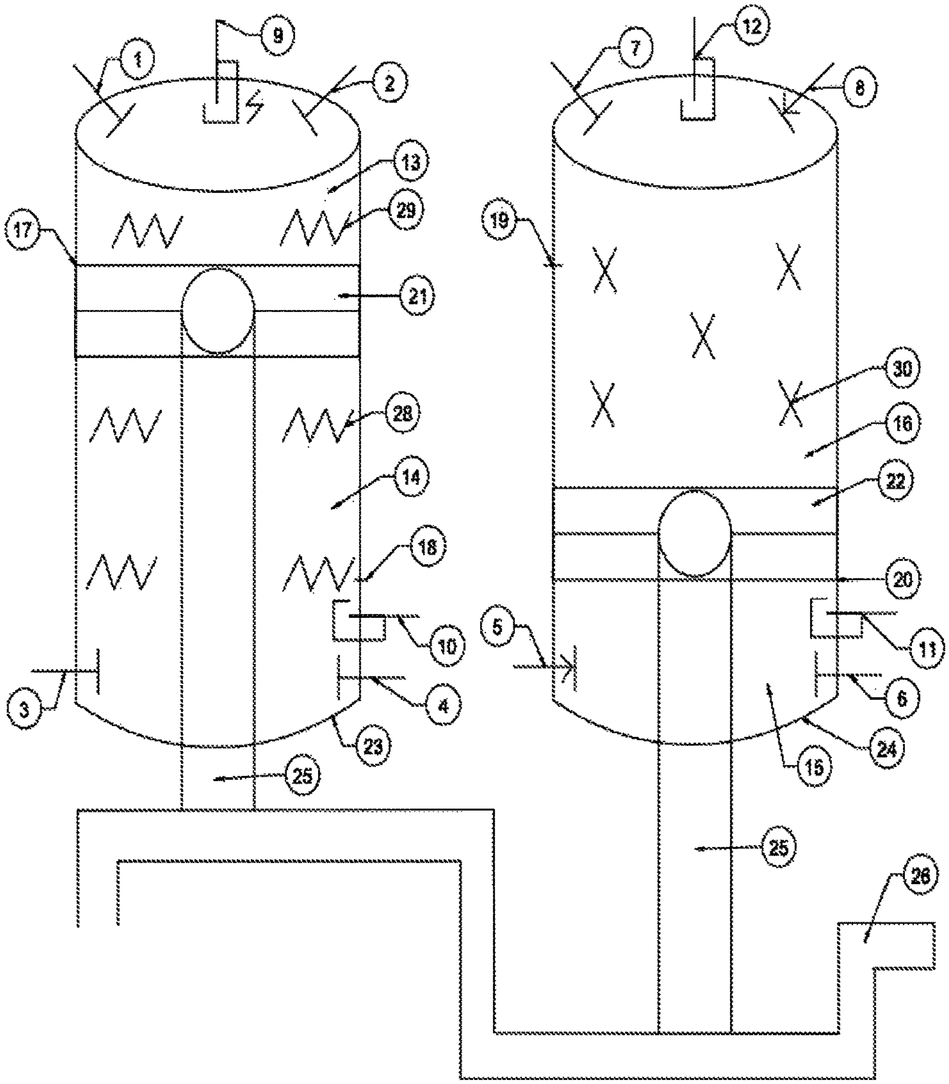

Fig.1

| Key | |
|---|---|
| Symbol | Representation |
| | Spark Plug |
| | Spark from Spark Plug |
| | Valve |
| | Opening of Valve |
| | Uncompressed Air-Fuel Mixture |
| | Compressed Air-Fuel Mixture |
| | Exhaust Residue Gases |
| | Piston Movement Direction |

| Number Labeling | |
|---|---|
| 1 | Inlet Valve of region 'a' |
| 2 | Exhaust valve of region 'a' |
| 3 | Inlet valve of region 'b' |
| 4 | Exhaust valve of region 'b' |
| 5 | Inlet Valve of region 'c' |
| 6 | Exhaust valve of region 'c' |
| 7 | Inlet Valve of region 'd' |
| 8 | Exhaust valve of region 'd' |
| 9 | Spark plug of region 'a' |
| 10 | Spark plug of region 'b' |
| 11 | Spark plug of region 'c' |
| 12 | Spark plug of region 'd' |
| 13 | region 'a' |
| 14 | region 'b' |
| 15 | region 'c' |
| 16 | region 'd' |
| 17 | Top Dead Center of region 'a' |
| 18 | Bottom Dead Center of region 'a' |
| 19 | Top Dead Center of region 'd' |
| 20 | Bottom Dead Center of region 'd' |
| 21 | Piston 1 |
| 22 | Piston 2 |
| 23 | Cylinder 1 |
| 24 | Cylinder 2 |
| 25 | Connecting Rod |
| 26 | Crank-Shaft |
| 27 | Double sided piston |
| 28 | Uncompressed Air-Fuel Mixture |
| 29 | Compressed Air-Fuel Mixture |
| 30 | Exhaust Residue gases |

MHMF ALTERNATING INTERNAL COMBUSTION ENGINE

BACKGROUND OF THE INVENTION

Internal Combustion Engine (ICE) is a type of engine that utilizes chemical energy of fuel through combustion to generate proportional mechanical energy. The Internal Combustion Engine revolutionized the automobile industry.

ICE is low cost, efficient and has favorable power to weight ratio. ICE over the course of development showed improved efficiency.

The proposed engine design is advancement upon the traditional Internal Combustion Engine seeking to increase the efficiency and reduce the power losses.

FIELD OF THE INVENTION

The proposed inventive Internal Combustion Engine comprises combustion at both surfaces of the double-sided piston extracting more power from a single cylinder and reducing the power losses to improve performance.

SUMMARY OF THE INVENTION

This inventive design of Internal Combustion Engine has a low engine weight to high power ratio and enhanced efficiency. The engine of invention provides substantial changes to both engine architecture and functioning over the traditional Internal Combustion Engine. MHMF Alternating Internal Combustion Engine has Cylinder 1, Cylinder 2, Piston 1, Piston 2, Cycle 1 and Cycle 2. The MHMF engine also has Region ‘a’ above Piston 1, Region ‘b’ below Piston 1, Region ‘c’ below Piston 2 and Region ‘d’ above Piston 2.

This inventive combustion engine works on the principle of extending power directly to alternating region in the same cylinder obtaining enhanced efficiency over a traditional engine.

In cylinder, expansion in one region of the cylinder—through combustion of air fuel mixture—powers directly the compression of fuel in the opposite region and exhaust in alternating region of the other cylinder.

The crankshaft is used to deliver power to flywheel as well as it is arranged for the alternating movement of pistons in both cylinders.

Due to alternating movement of pistons in Cylinder 1 and 2, the cycles are the same albeit in opposite direction on account of time parameter.

The piston in each cylinder goes through two power strokes delivering power to the crankshaft and supplementing the processes in the other cylinder.

Piston 1 delivers one of the two power strokes through combustion in Region ‘a’ that compresses air-fuel mixture in Region ‘b’ while Piston 2 provides exhaust stroke to Region ‘d’ and intake stroke to Region ‘c’. Piston 1 again delivers power stroke through combustion in Region ‘b’ that provides exhaust stroke to Region ‘a’ while in Cylinder 2, Piston 2 provides compression stroke to Region ‘c’ and intake stroke to Region ‘d’.

Piston 2 delivers one of the two power strokes through combustion in Region ‘c’ that compresses air-fuel mixture in Region ‘d’ while Piston 1 provides intake stroke to Region ‘a’ and exhaust stroke to Region ‘b’. Piston 2 again delivers power stroke through combustion in Region ‘d’ that provides exhaust stroke to Region ‘c’ while in Cylinder 1, Piston 1 provides compression stroke to Region ‘a’ and intake stroke to Region ‘b’.

MHMF engine works on the principle of directly contributing to the cycle steps in alternating regions of the cylinders hence enhancing engine performance.

BRIEF DESCRIPTION OF DRAWINGS

FIG. 1 shows the complete description of the geometry, parameters and identification of the regions within the cylinders comprising of different states at every instance in the cycle. The identification is provided through a legend which is further denoted by using numbers following the structure.

FIG. 1.*b* shows the double sided piston.

DETAILED DESCRIPTION OF THE INVENTION

The inventive MHMF engine is a unique design. It has 2 cylinders and 2 pistons inversely connected through crankshaft. Its processes are: intake/compression/power/exhaust. The initial condition is such that there is uncompressed fuel in Upper Section of Cylinder 1, Region ‘a’, empty space post exhaust stroke in Lower section of Cylinder 1, Region ‘b’, residue gases in Lower section of Cylinder 2, Region ‘c’ and compressed air-fuel mixture in Upper section of Cylinder 2, Region ‘d’. In Cylinder 1 movement of Piston 1 is defined by Top Dead Center (TDC) and Bottom Dead Center (BDC)

of Region 'a'. In Cylinder 2 movement of Piston 2 is defined by TDC and BDC of Region 'd'.

Figure 1B:
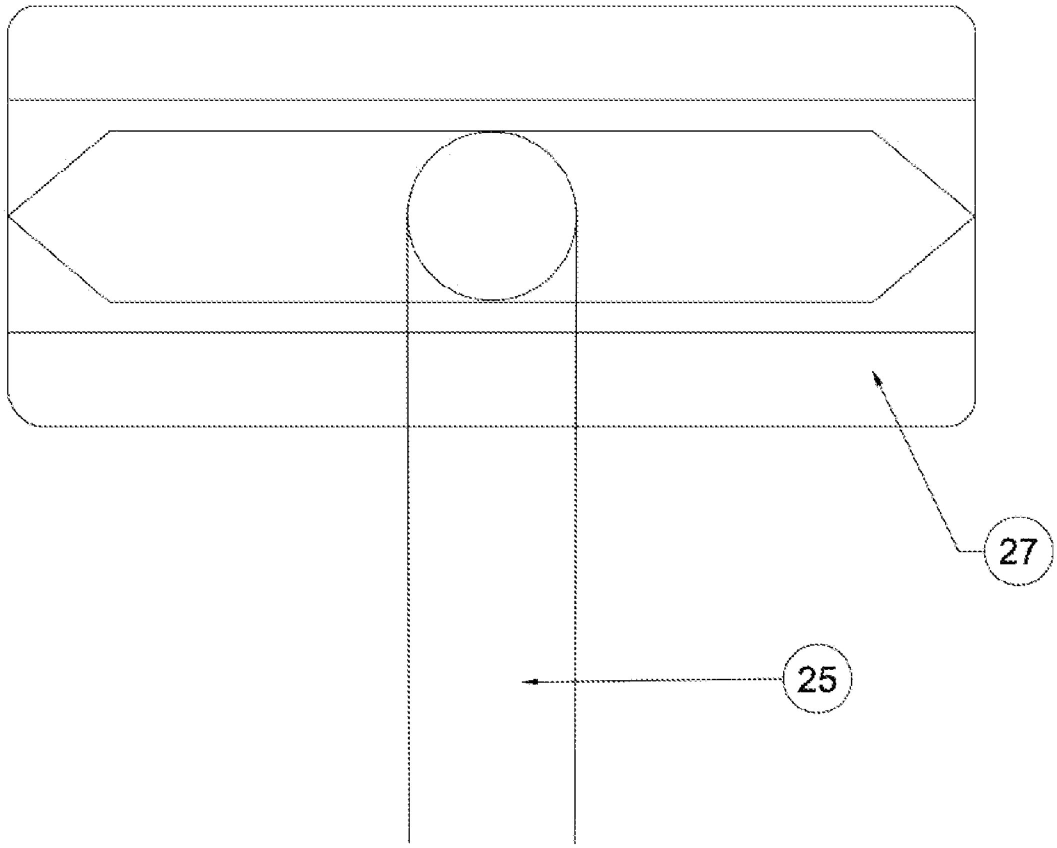
FIG. 1 shows the complete schematic diagram with the key reflecting features of the MHMF engine.
Figure 2:
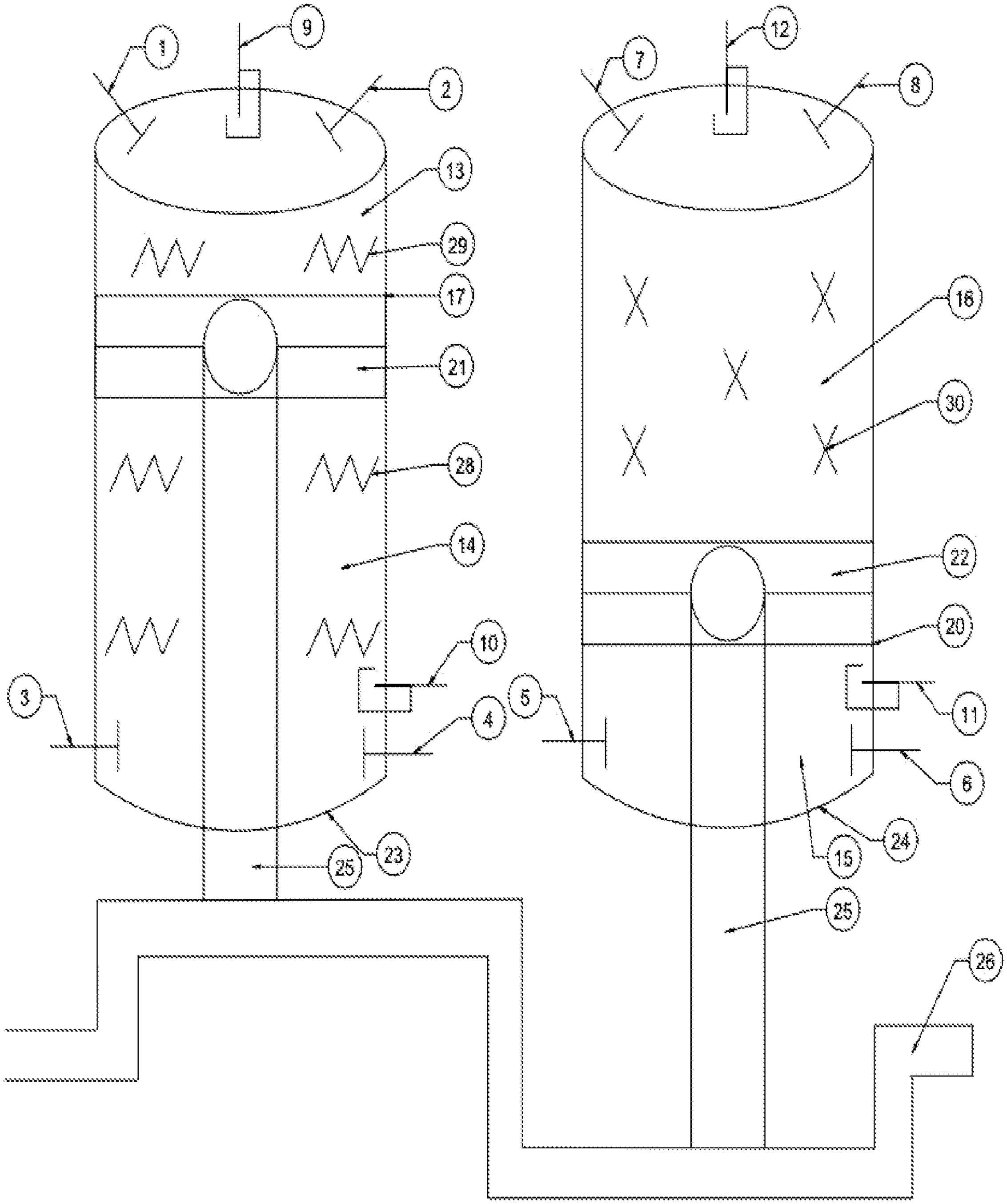
FIG. 2 illustrates the stationary stage of the cycle with different states in each region of the cylinders.

Piston 1 of Cylinder 1 moved to TDC of Region 'a' causing the uncompressed air-fuel mixture in Region 'a' to be compressed. When Piston 1 moved to TDC of Region 'a', it provides intake stroke to charge Lower region of Cylinder 1, Region 'b' with fresh air-fuel mixture. As shown in FIG. 2.

In FIG. 2, the upper region of Cylinder 1 23, Region 'a' 13 shows compressed air-fuel mixture. Piston is at Top Dead Center (TDC) 17 of Region 'a' 13 compressing the air-fuel mixture in Region 'a' 13. Fresh charge of uncompressed air-fuel mixture is in the lower region of Cylinder 1 23, Region 'b' 14.

In FIG. 2, Cylinder-2 24 shows piston at BDC 20 of Region 'd' 16, exhaust charge in Region 'd' 16 above Piston 2 2, and empty space in Region 'c' 15.

The movement of Piston 1 was due to power stroke delivered by Cylinder 2. In Cylinder 2 combustion of compressed air-fuel mixture in Region 'd' delivers power stroke consequently providing exhaust stroke to residue gases in Region 'c'.

In the next stage, the compressed air-fuel mixture in Region 'a' combusts to provide power stroke causing the Piston 1 to move to BDC of Region 'a'. Movement of Piston 1 compresses the air-fuel mixture in Region 'b' leaving residue gases in Region 'a' due to combustion.

Figure 3:
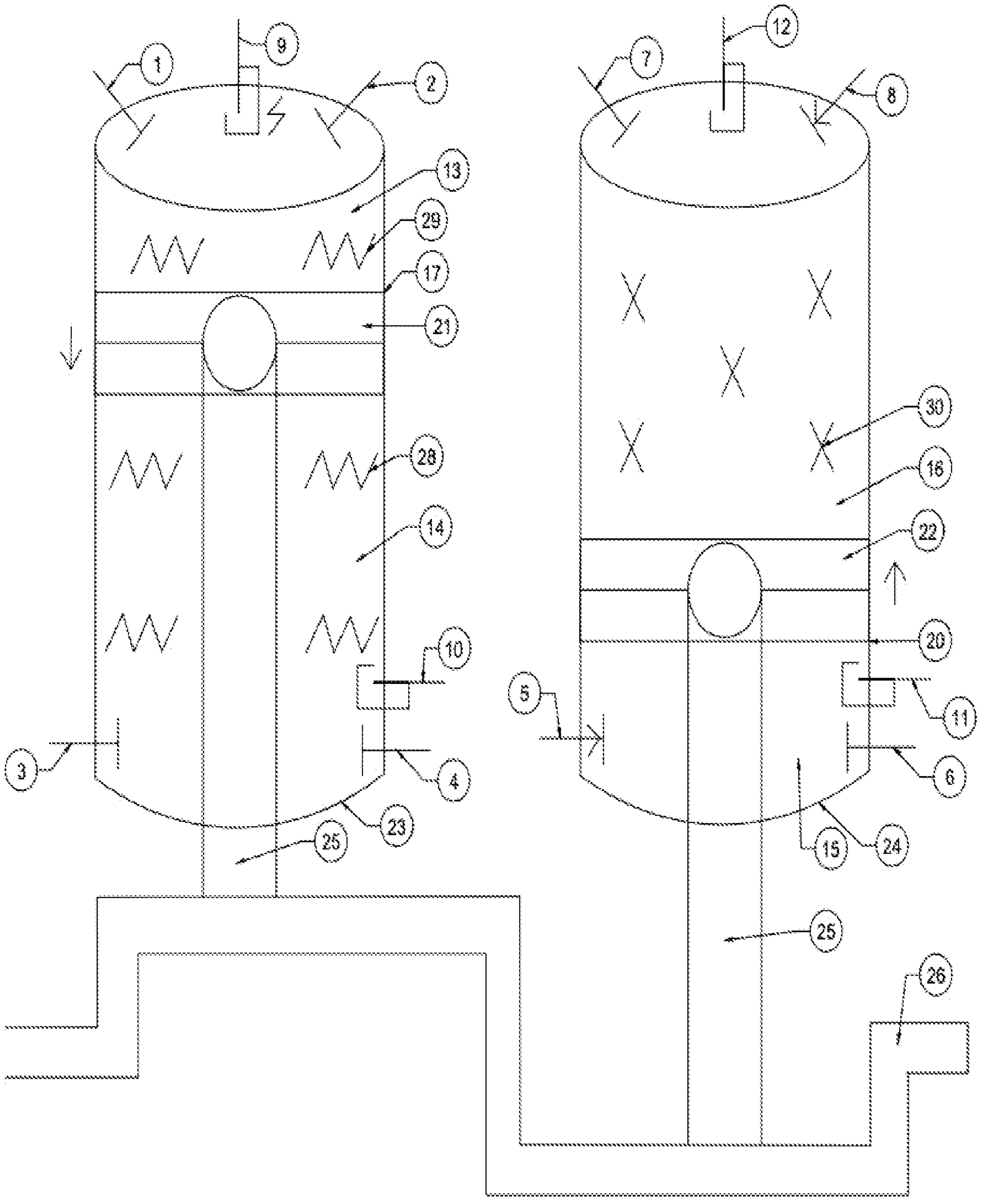
FIG. 3 illustrates the working stage of the cycle with spark plug igniting combustion in Region ‘a’.

Simultaneously, in Cylinder 2, the Piston 2 moves to TDC of Region 'd', providing intake stroke to Region 'c' and exhaust stroke to Region 'd'. As shown by FIG. 3.

In FIG. 3, the spark 9 causes combustion of compressed air-fuel mixture in Region 'a' 13, which moves Piston 1 21 to BDC 18 of Region 'a' 13, which will consequently move the Piston 2 22 in Cylinder 2 24 to TDC 19 of Region 'd' 16.

Figure 4:
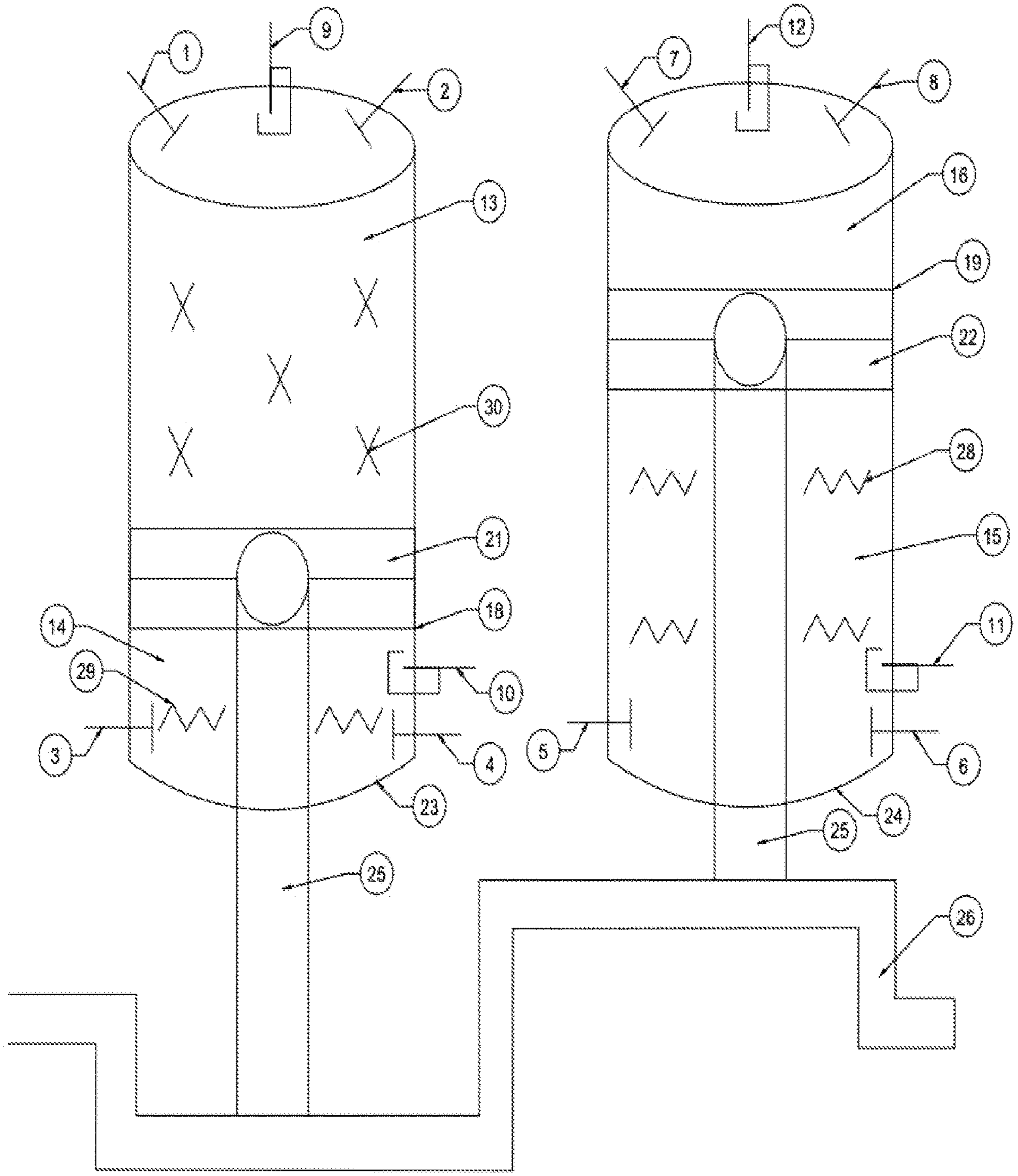
FIG. 4 illustrates the stationary stage of the cycle with different states in each region of the cylinders.

At current stage, there are residue gases in the Upper section of Cylinder 1, Region 'a', compressed air-fuel mixture in the Lower section of Cylinder 1, Region 'b' as Piston 1 has moved to BDC of Region 'a' in Cylinder 1. In Cylinder 2, there is vacant space for fresh air-fuel mixture post exhaust stroke in Upper section of Cylinder 2, i.e., Region 'd' and uncompressed air-fuel mixture in the Lower section of Cylinder 2 i.e., Region 'c'. As shown by FIG. 4.

FIG. 4 shows presence of residue gases 30 in Region 'a' 13 due to combustion. Piston 1 21 moved to BDC 18 of Region 'a' 13. There is compressed air-fuel mixture in Region 'b' 14. Consequently, Piston 2 22 moved to the TDC 19 of Region 'd' 16 of Cylinder 2 24. This movement scavenges residue gases from Region 'd' 16 and provides intake of fresh air-fuel mixture to Region 'c' 15.

Figure 5:
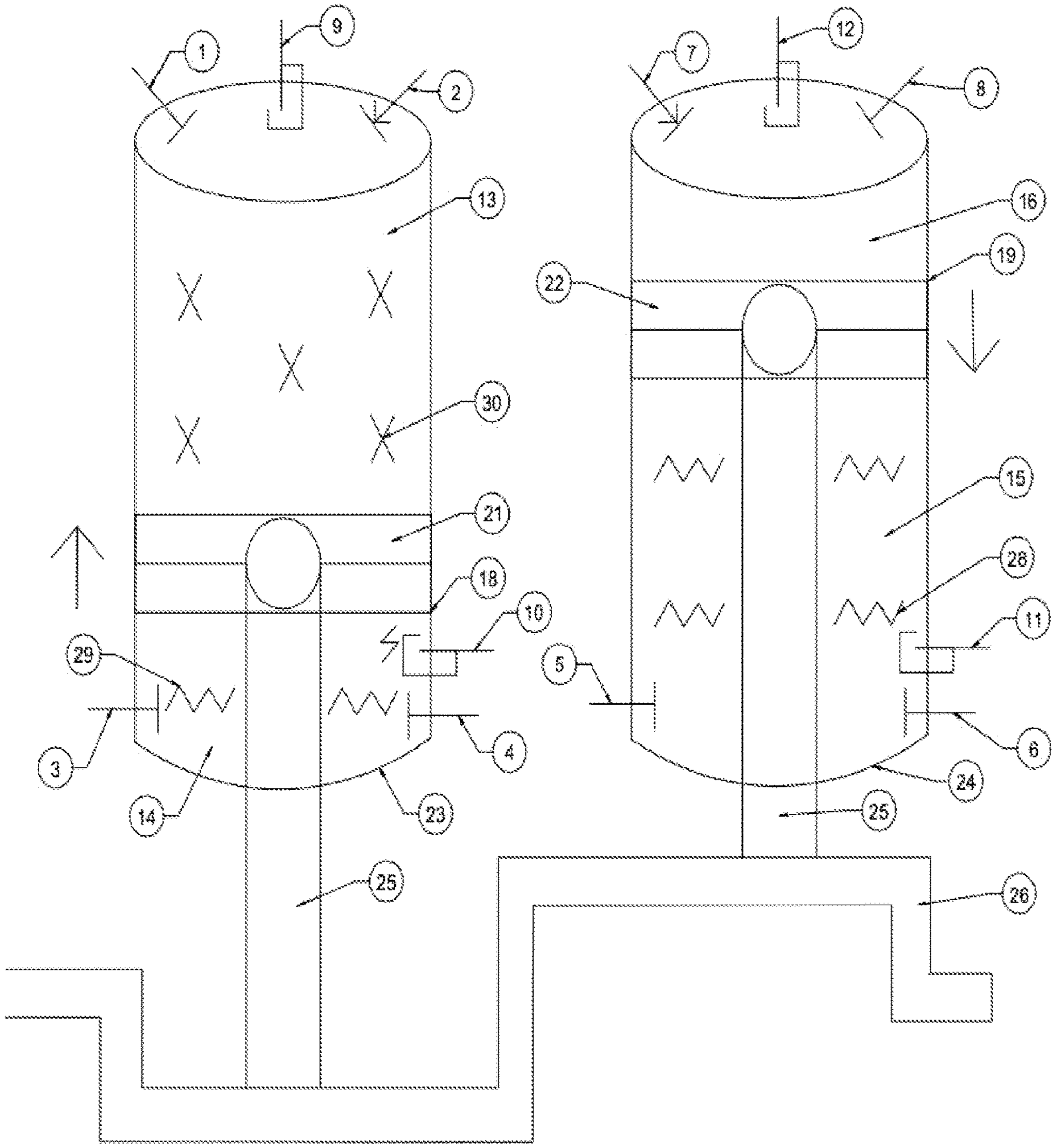
FIG. 5 illustrates the working stage of the cycle with spark plug igniting combustion in Region ‘b.’

At this stage there is combustion in Region 'b' causing Piston 1 to move to TDC of Region 'a' delivering power stroke and providing exhaust stroke to Region 'a' moving out the residue gases through exhaust valve. Simultaneously, Piston 2 moved down to BDC of Region 'd' causing the uncompressed air-fuel mixture in Region 'c' to be compressed and intake stroke for uncompressed air-fuel mixture in Region 'd'. As shown by FIG. 5.

FIG. 5 shows that, spark 10 ignites compressed air-fuel mixture in Region 'b' 14 of Cylinder 1 23. The combustion in Region 'b' 14 will move Piston 1 21 in Cylinder 1 to TDC 17 of Region 'a' 13 and Piston 2 22 in Cylinder 2 24 to BDC 20 of Region 'd' 16.

Figure 6:
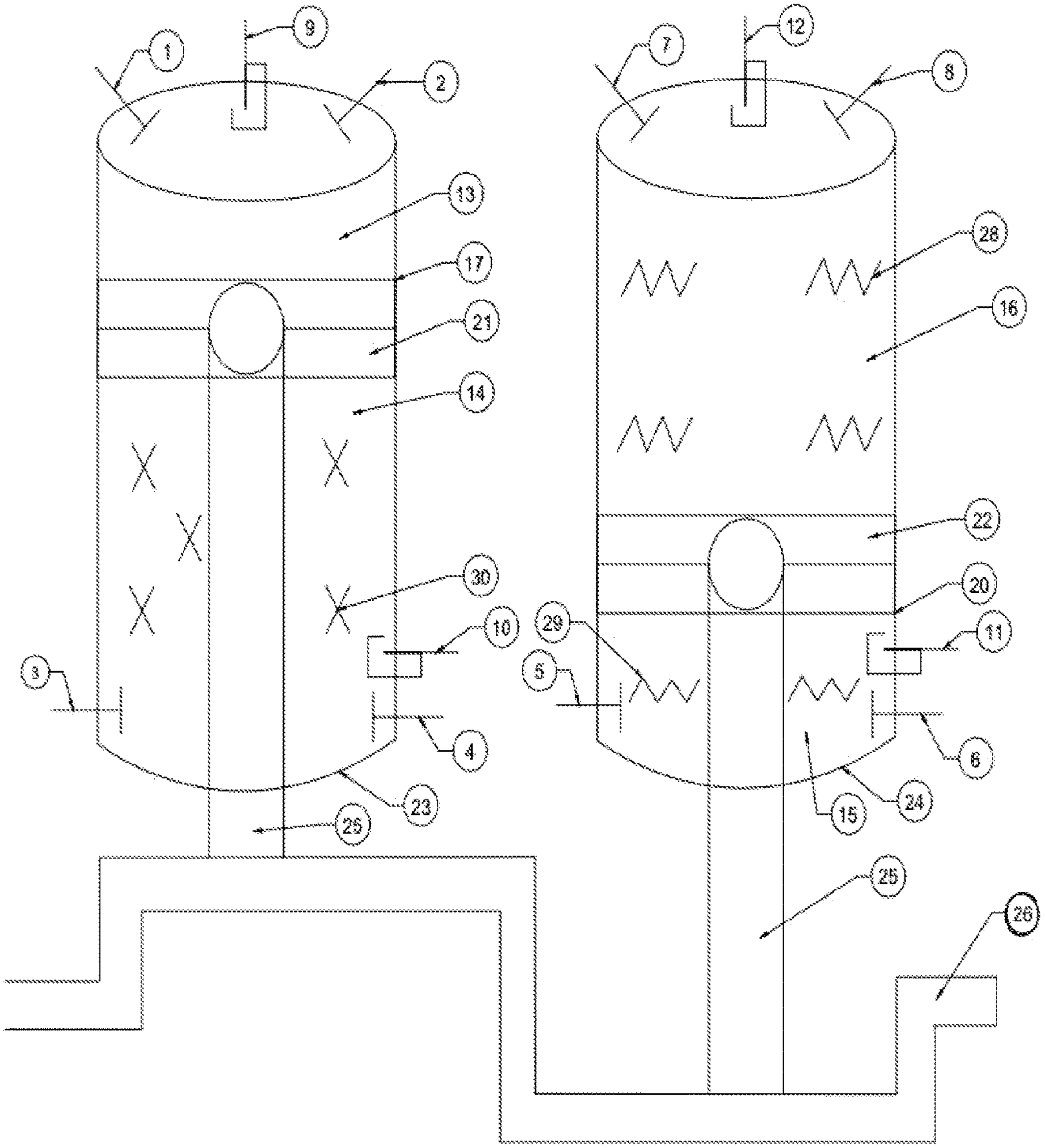
FIG. 6 illustrates the stationary stage of the cycle with different states in each region of the cylinders.

At this stage, there are residue gases in Region 'b', and vacant space in vacant space post exhaust stroke in Region 'a' of Cylinder 1 as Piston 1 has moved to TDC of Region 'a' in Cylinder 1. There is compressed air-fuel mixture in Region 'c' and uncompressed air-fuel mixture in Region 'd' of Cylinder 2. As shown by FIG. 6.

FIG. 6 shows that Piston 1 21 in Cylinder 1 23 is at TDC 17 of Region 'a' 13 scavenging the exhaust gases in Region 'a' 13 of Cylinder 1 23. Region 'b' 14 has exhaust gases 30 post combustion.

Piston 2 22 in Cylinder 2 24 is at BDC 20 of Region 'd' 16. The movement of Piston 2 22 allowed compression stroke to air-fuel mixture in Region 'c' 15 and intake stroke for fresh charge of air-fuel mixture in Region 'd' 16.

Figure 7:
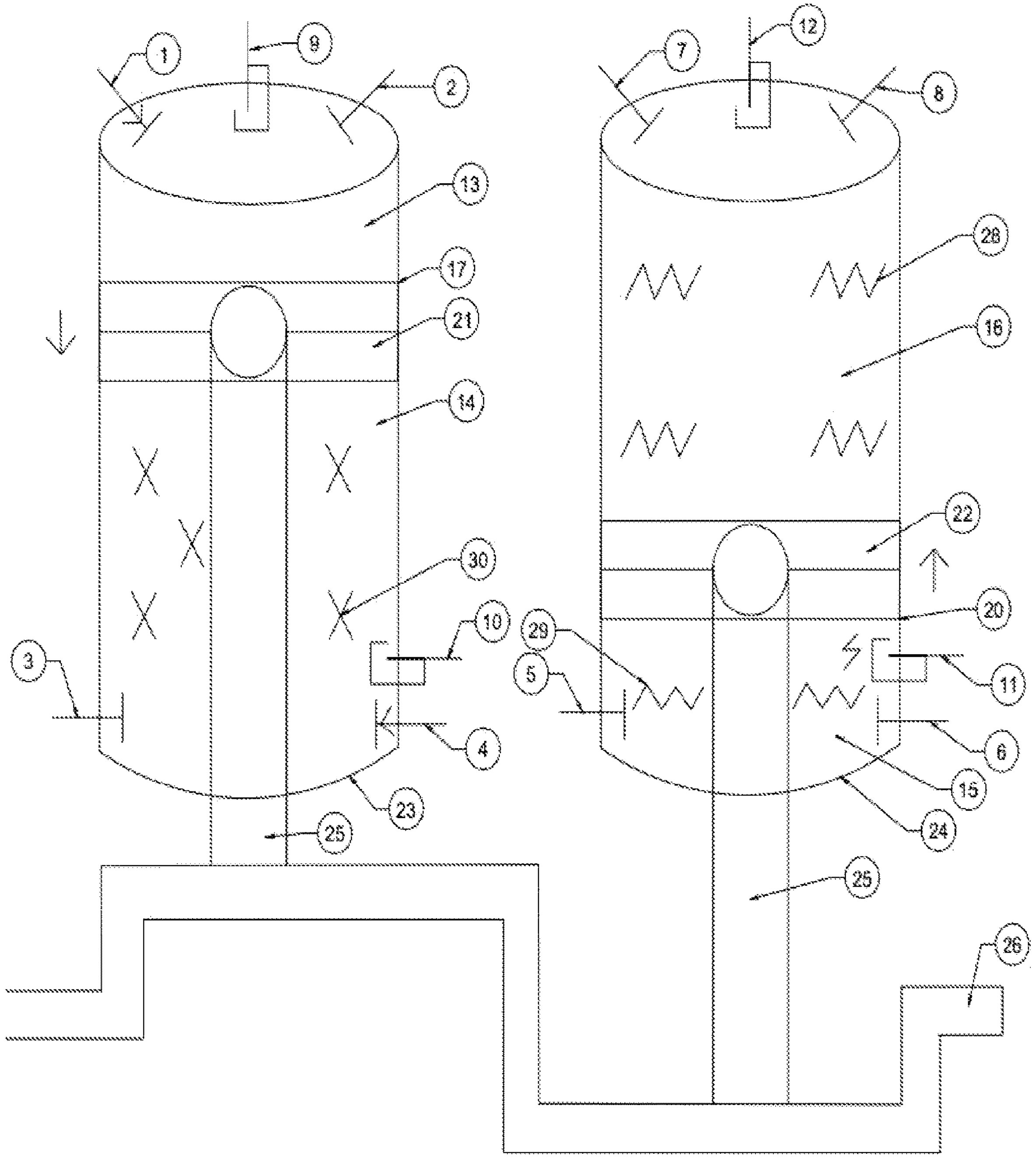
FIG. 7 illustrates the working stage of the cycle with spark plug igniting combustion in Region ‘c’

Now the combustion takes place in Region 'c' moving Piston 2 to TDC of Region 'd' providing power stroke and compressing the uncompressed air-fuel mixture present in Region 'd'. Simultaneously, Piston 1 moved to BDC of Region 'a' providing intake stroke of uncompressed air-fuel mixture to Region 'a' and exhaust stroke to residue gases in Region 'b' through exhaust valve. As shown by FIG. 7.

FIG. 7 shows that the combustion of compressed air-fuel mixture takes place in Region 'c' 15 of Cylinder 2 24. The combustion in Region 'c' 15 will move Piston 2 22 to TDC 19 of Region 'd' 16 compressing the air-fuel mixture in Region 'd' 16 and housing exhaust gases 30 due to combustion in Region 'c' 15. Consequently, Piston 1 21 in Cylinder 1 23 moves to BDC 18 of Region 'a' 13 and Piston 2 22 in Cylinder 2 24 to TDC 19 of Region 'd' 16.

Figure 8:
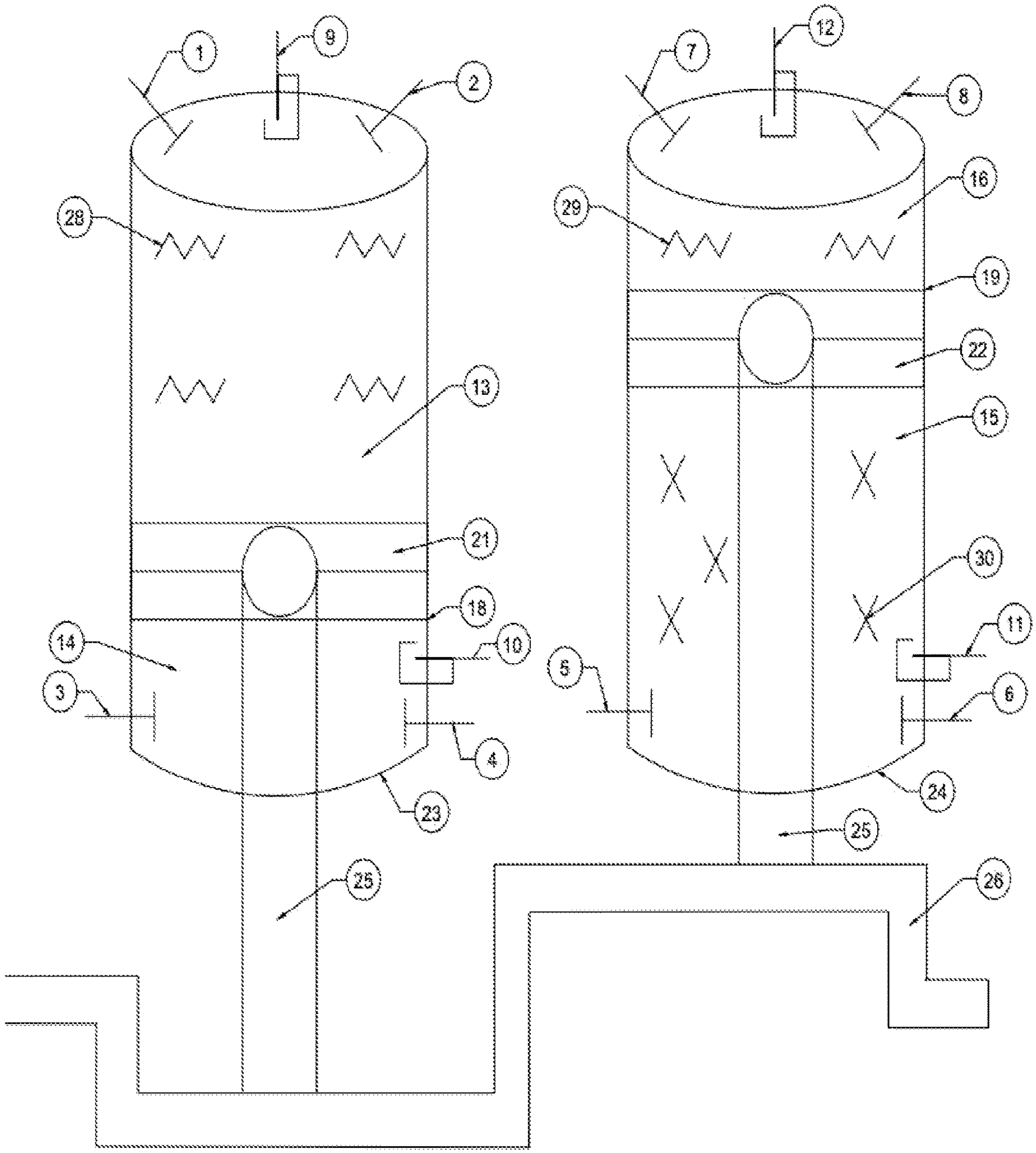
FIG. 8 illustrates the stationary stage of the cycle with different states in each region of the cylinders.

At this stage, there are residue gas in Region 'c', compressed air-fuel mixture in Region 'd', empty space post exhaust stroke in Region 'b' and uncompressed air-fuel mixture in Region 'a'. As shown by FIG. 8.

FIG. 8 depicts Piston 1 21 is at BDC 18 of Region 'a' 13 charging Region 'a' 13 with fresh charge of air-fuel mixture and scavenging the exhaust gases from Region 'b' 14.

In Cylinder 2 24, Piston 2 22 is at TDC 19 of Region 'd' 16 due to power stroke delivered by combustion in Region 'c' 15 providing compression stroke to air-fuel mixture in Region 'd' 16. It also shows presence of residue exhaust gases 30 in Region 'c' 15 post-combustion.

Figure 9:
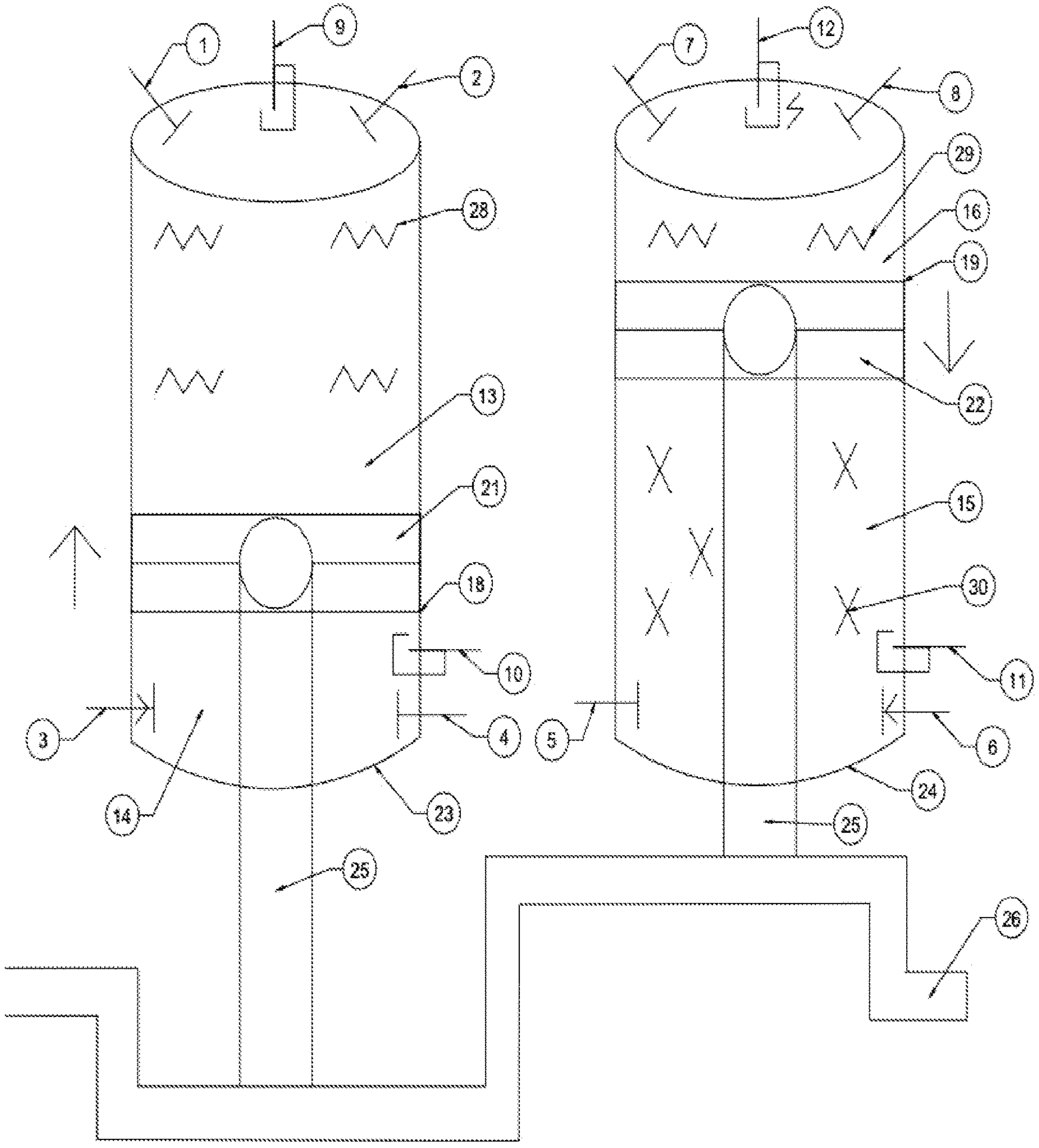
FIG. 9 illustrates the working stage of the cycle with spark plug igniting combustion in Region ‘d’

Next, combustion of compressed air-fuel mixture in Region 'd' delivers power stroke, causing the piston in Cylinder 2, Piston 2 to move to BDC of Region 'd' and providing exhaust stroke to Region 'c'. Simultaneously, Piston 1 in Cylinder 1 moved to TDC of Region 'a', compressing the uncompressed air-fuel mixture present in Region 'a' and providing intake stroke to Region 'b'. As shown by FIG. 9.

FIG. 9 shows that the compressed charge of air-fuel mixture in Region 'd' 16 combusts to provide power stroke which moves Piston 2 22 to BDC 20 of Region 'd' 16 and Piston 1 21 to TDC 17 of Region 'a' 13. Movement of Piston 1 21 provided compression stroke to air-fuel mixture in Region 'a' 13 and intake stroke to air-fuel mixture in Region 'b' 14. Movement of Piston 2 22 to BDC 20 of Region 'd' 16 provided exhaust stroke to exhaust residue gases 30 in Region 'c' 15.

At this stage, there are residue gases due to combustion in Region 'd', as Piston 2 moved to BDC of Region 'd' providing exhaust stroke to Region 'c'. Simultaneously, Piston 1 moved to TDC of Region 'a', providing compression stroke to Region 'a' and intake stroke to Region 'b'. Combustion of compressed air-fuel mixture in Region 'd' leads to initial cylinder stages as represented by FIG. 2.

The combustion occurs in compressed air-fuel mixture of Region 'a' moving Piston 1 to BDC of Region 'a' causing compression stroke to Region 'b'. Consequently, Piston 2 moves to TDC of Region 'd' providing intake stroke to Region 'c' and exhaust stroke to Region 'd', leading to stages of cylinders shown by FIG. 3.

At this stage, there are residue gases in Region 'a', compressed air-fuel mixture in Region 'b', uncompressed air-fuel mixture in Region 'c' and vacant space for intake of air-fuel mixture in Region 'd' shown by FIG. 4.

Next the combustion takes place in Region 'b', causing Piston 1 to TDC of Region 'a', providing exhaust stroke to Region 'a'. Consequently, Piston 2 moves to BDC of Region 'd' providing compression stroke to Region 'c' and intake stroke to Region 'd' while there are residue gases in Region 'b'. Stages of cylinders are illustrated by FIG. 5.

At this stage, there are residue gases in Region 'b', empty space in Region 'a', compressed air-fuel mixture in Region 'c' and uncompressed air-fuel mixture in Region 'd'. Stages of cylinders are illustrated by FIG. 6.

Next the combustion takes place in Region 'c', moving Piston 2 to TDC of Region 'd' providing power to crankshaft and compressing the air-fuel mixture in Region 'd'. Consequently, Piston 1 moves to BDC of Region 'a' proving intake stroke to Region 'a' and exhaust stroke to Region 'b'. Stages of cylinders are illustrated by FIG. 7.

At this stage there are residue gases in Region 'c', compressed air-fuel mixture in Region 'd', uncompressed air-fuel mixture in Region 'a' and empty space in Region 'b'. Stages of cylinders are illustrated by FIG. 8.

Next the combustion takes place in Region 'd' moving Piston 2 to BDC of Region 'd', providing exhaust stroke to Region 'c' and delivering power to crankshaft. Consequently, Piston 1 moves to TDC of Region 'a' causing the uncompressed air-fuel mixture in Region 'a' to be compressed through compression stroke, and providing intake of uncompressed air-fuel mixture in Region 'b' through intake stroke. There are residue gases in Region 'd'. Stages of cylinders are illustrated by FIG. 9.

At this stage, there are residue gases in Region 'd', empty space in Region 'c', compressed air-fuel mixture in Region 'a' and uncompressed air-fuel mixture in Region 'b' same as shown by FIG. 2.

This concludes the working of our continuous cycle.

Basic Working of Cylinder 1

Each cylinder is considered as a single entity with a modified engine piston. The piston is modified such that it has the ability to perform compression of air-fuel mixture on both sides, i.e., compression surfaces on both sides. Simply in general terms, the inventive piston is formed by fusing two regular pistons together oppositely faced to form a single double sided piston. Each cylinder is configured with crankshaft such that when the piston in one cylinder moves to Bottom Dead Center (BDC), the piston in the other cylinder moves to Top Dead Center (TDC); alternating movement of pistons in both cylinders.

Working related to single cylinder: Cylinder 1 23, with Region 'a' 13 and Region 'b' 14 with TDC 17 and BDC 18 of Region 'a' 13. TDC of Region 'a' is also the BDC of Region 'b' likewise BDC of Region 'a' is also the TDC of Region 'b'.

The working processes of the supplementary cylinder, in this case Cylinder 2 are same as that of Cylinder 1 but in reverse.

Cylinder 1 has one piston 21, one connecting rod 25, 2 intake valves 1/3, Region 'a' 13, Region 'b' 14, exhaust valves 2,4 and two spark plugs 9, 10.

Figure 10:
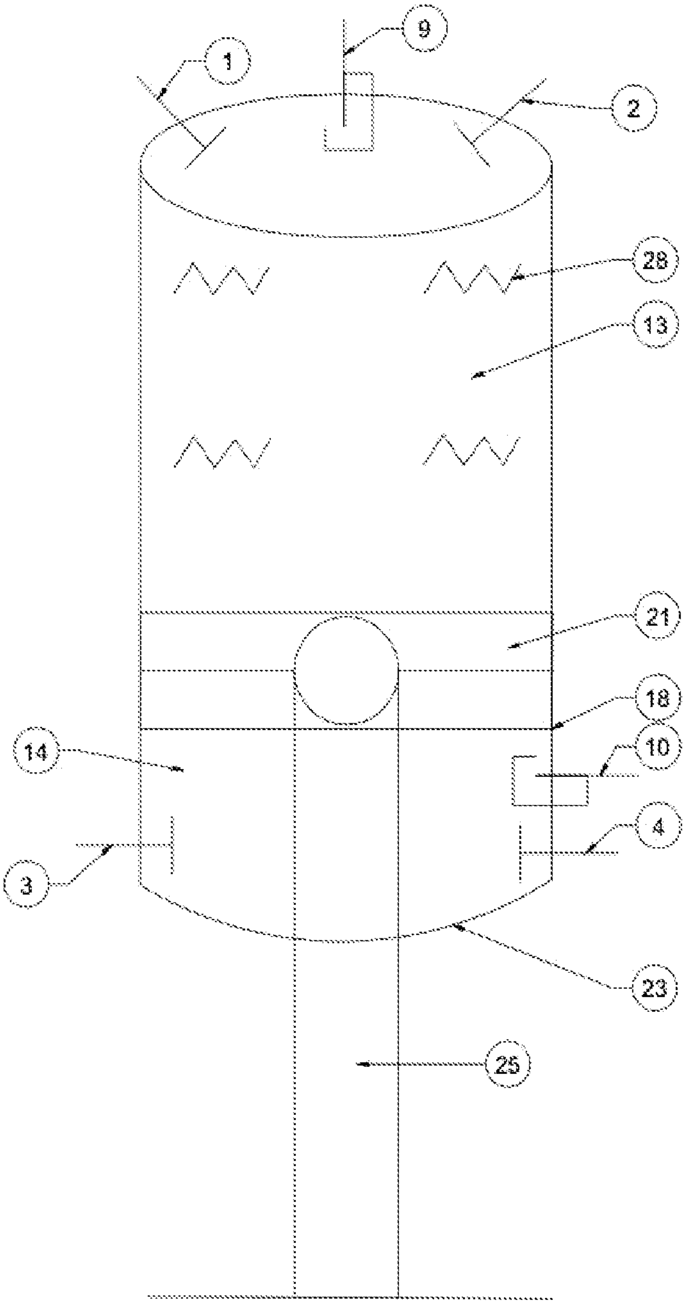
FIG. 10 to FIG. 14 show different operating stages of Cylinder 1.

When the fuel enters Region 'a', Piston 1 moves down providing exhaust stroke to Region 'b' and intake stroke to Region 'a', as depicted in FIG. 10.

FIG. 10 shows, Piston 1 21 is at BDC 18 of Region 'a' 13 charging Region 'a' 13 with fresh charge of air-fuel mixture through inlet valve 1.

Figure 11:
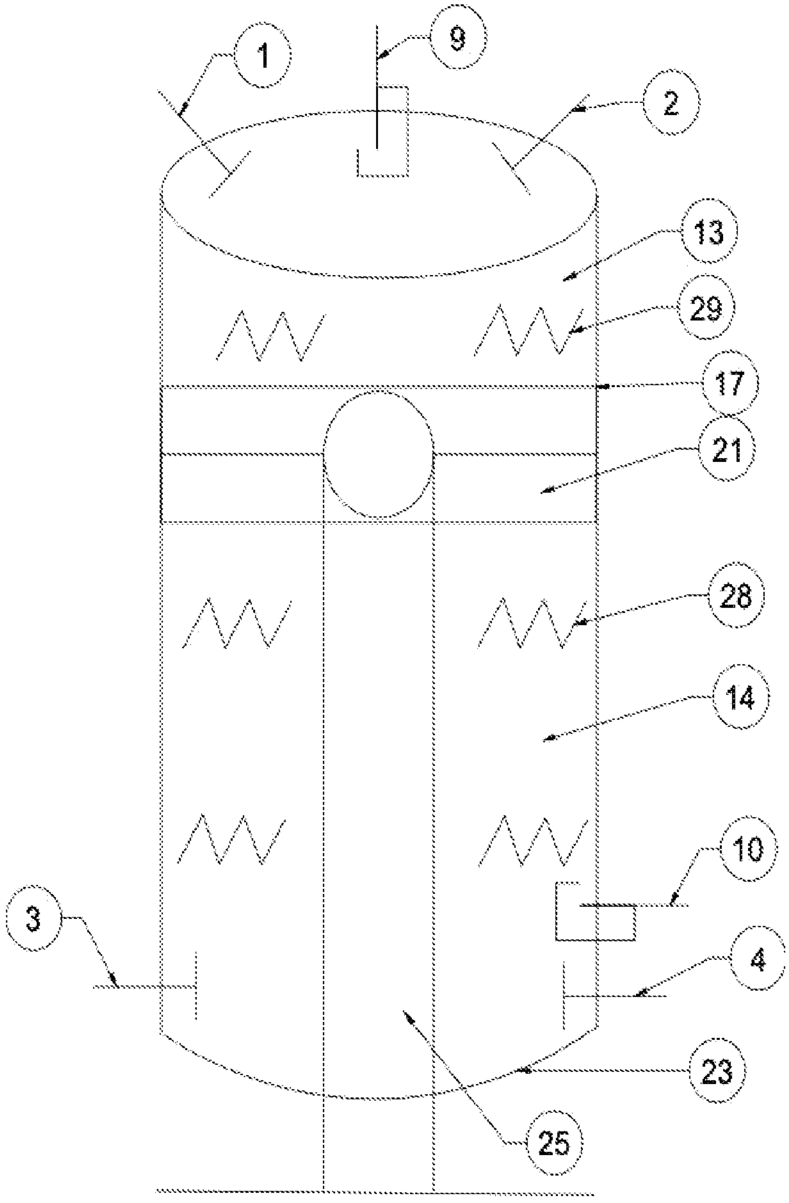

Piston 1 moves to TDC of Region 'a' to perform compression on air-fuel mixture in Region 'a' and supplementing intake stroke to Region 'b', as depicted in FIG. 11.

FIG. 11 shows, Piston 1 21 is at TDC 17 of Region 'a' 13 providing compression stroke to air-fuel mixture in Region 'a' 13 and charging Region 'b' 14 with fresh charge of air-fuel mixture by providing intake stroke to Region 'b' 14 through inlet valve 3

The power stroke in Region 'a' supplements compression stroke in Region 'b'. As both regions have a single shared piston so both regions are directly related and supplement the processes of opposite regions, as depicted in FIG. 12.

Figure 12:
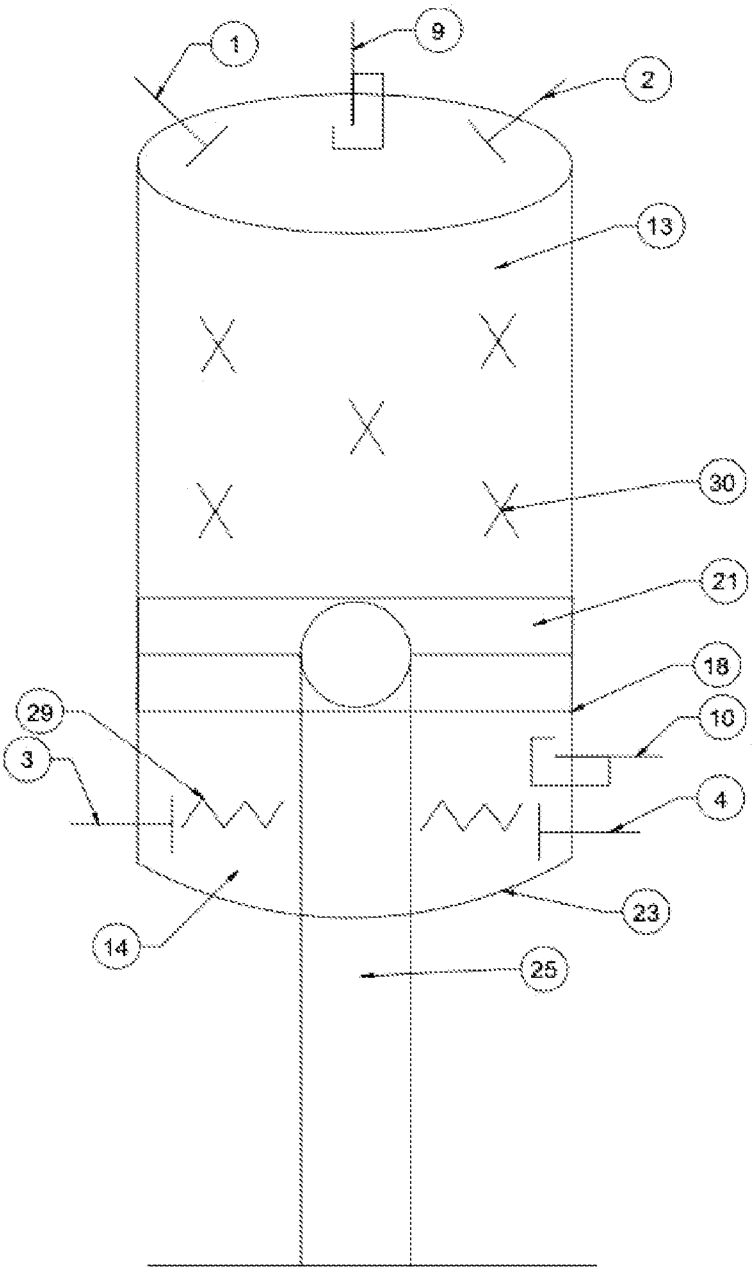

FIG. 12 shows the compressed air-fuel mixture in Region 'a' 13 combusts to provide power stroke that moved Piston 1 21 to BDC 18 of Region 'a' 13, consequently providing compression stroke to compress air-fuel mixture in Region 'b' 14. Region 'a' 13 houses residue gases 30 due to combustion.

Figure 15:
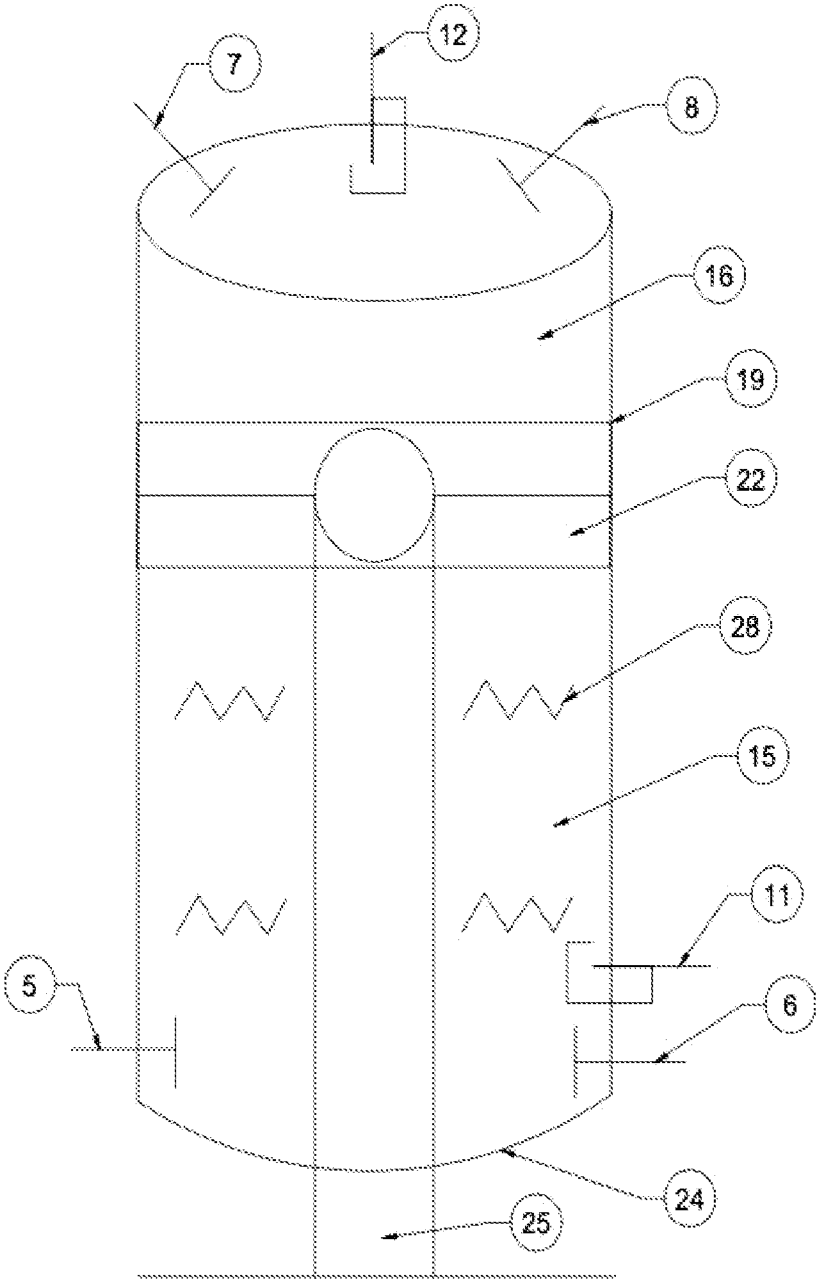
FIG. 15 to FIG. 19 show different operating stages of Cylinder 2.

The power stroke also moves Piston 2 in the supplementary cylinder, Cylinder 2 to TDC of Region 'd' providing exhaust stroke to Region 'd' and intake stroke to Region 'c' as shown by FIG. 15.

Figure 13:
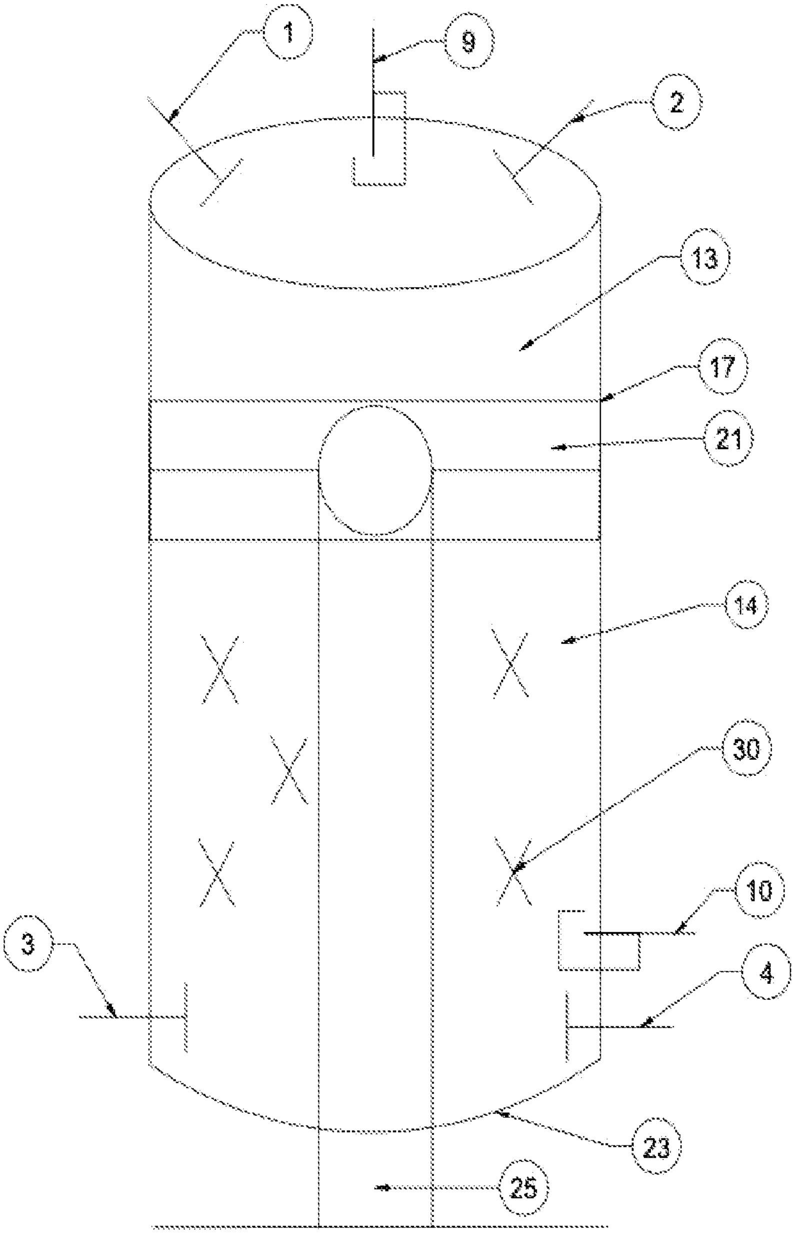

As depicted in FIG. 13, the power stroke from combustion in Region 'b' delivers power and supplements the exhaust stroke of Region 'a'.

FIG. 13 shows, the compressed air-fuel mixture in Region 'b' 14 combusts to provide power stroke that moved Piston 1 21 to TDC 17 of Region 'a' 13 purging exhaust from Region 'a' 13. Region 'b' 14 at this stage houses exhaust residue 30.

Figure 16:
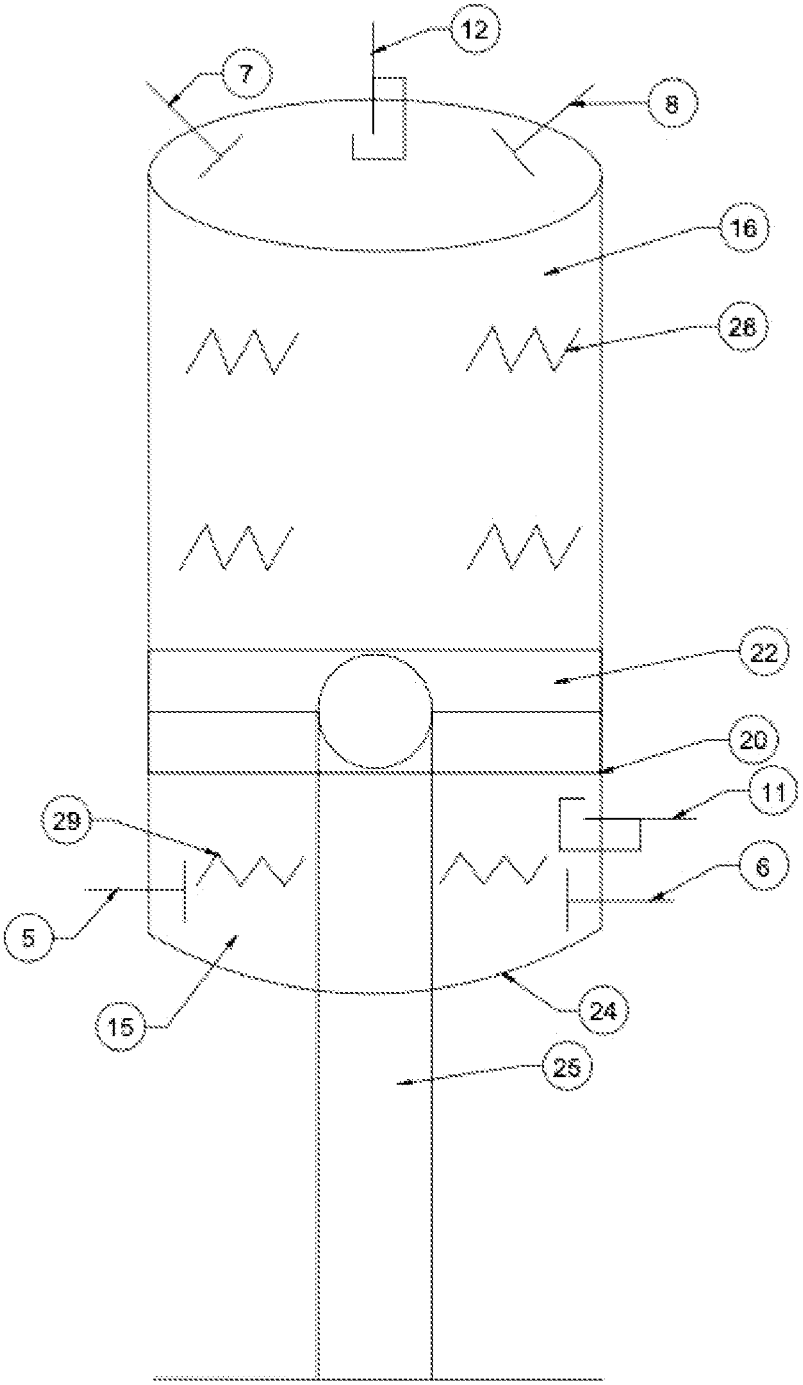

The power stroke also moves Piston 2 in the supplementary cylinder, Cylinder 2 to BDC of region 'd' providing compression stroke to air-fuel mixture in region 'c' and intake stroke to region 'd' as shown by FIG. 16.

Figure 14:
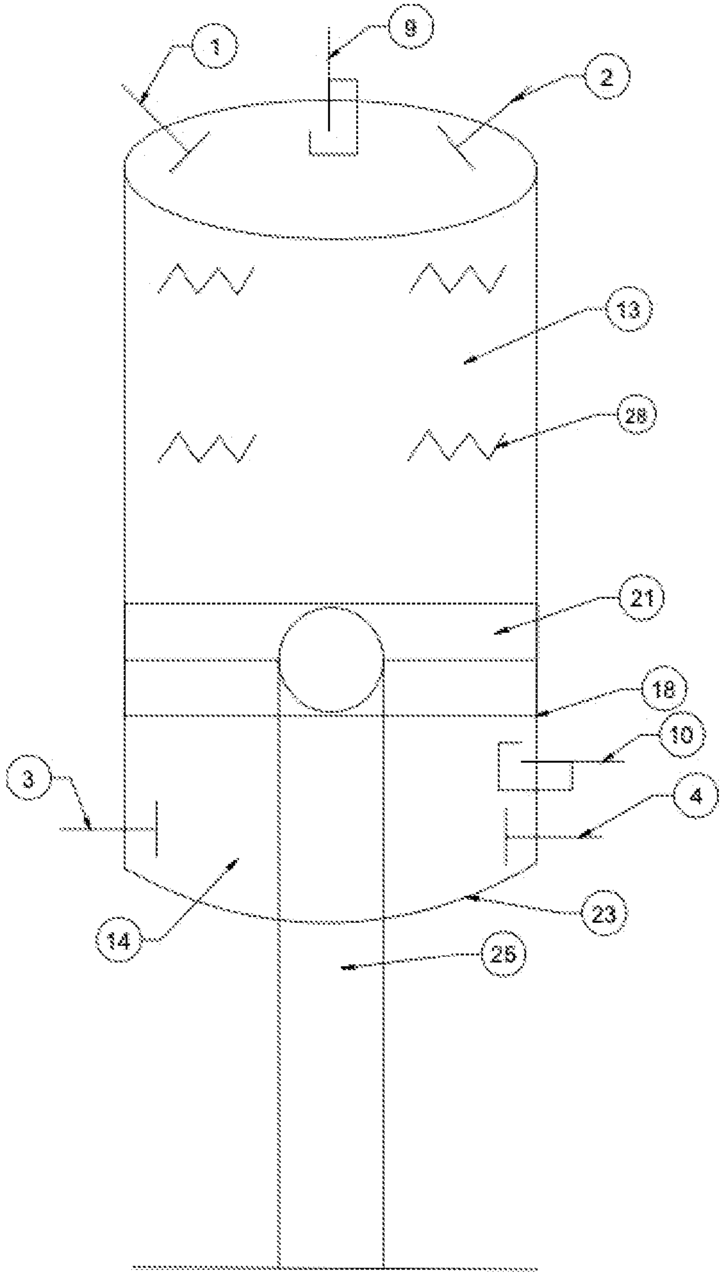

FIG. 14 illustrates the same initial state of the cylinder as shown in FIG. 10 which shows that Piston 1 21 is at BDC 18 of Region 'a' 13, purging the exhaust gases 30 from Region 'b' 14 and charging Region 'a' 13 with fresh charge of air-fuel mixture.

This describes the basic working of a single cylinder of this inventive engine obtaining positive net power. To form a continuous power generation cycle in inventive engine, another cylinder with same stated operations acting inversely is introduced.

The piston movement in one cylinder is opposite to the piston movement in the other cylinder i.e., when the piston in one cylinder moves to BDC, the piston in the other cylinder moves to TDC.

Basic Working of Cylinder 2

Cylinder 2 has one piston 22, one connecting rod 25, two intake valves 5,7, Region 'c' 15, Region 'd' 16, two exhaust valves 6,8 and two spark plugs 11, 12.

Each cylinder is configured with crankshaft such that when the piston in one cylinder moves to BDC the piston in the other cylinder moves to TDC; alternating motion of the pistons.

FIG. 15 shows initial state of Cylinder 2, with Piston 2 moving to TDC of Region 'd' providing exhaust stroke to residue gases in Region 'd' and intake stroke for fresh air-fuel mixture to Region 'c'. The movement of Piston 2 is caused by the power stroke delivered by Cylinder 1, due to combustion in Region 'a' shown by FIG. 12.

FIG. 15 illustrates that Piston 2 22 is at TDC 19 of Region 'd' 16, charging Region 'c' 15 with fresh charge of air-fuel mixture through inlet valve 5.

FIG. 16 shows Cylinder 2, with Piston 2 moving to BDC of Region 'd' providing compression stroke to air-fuel mixture in Region ‘c’ and intake stroke for fresh air-fuel mixture to Region ‘d’. The movement of Piston 2 is caused by the power stroke delivered by Cylinder 1 due to combustion in Region ‘b’ shown by FIG. 13.

FIG. 16 shows that Piston 2 22 is at BDC 20 of Region ‘d’ 16, providing compression stroke to air-fuel mixture in Region ‘c’ 15 and charging Region ‘d’ 16 with fresh charge of air-fuel mixture by providing intake stroke to Region ‘d’ 16 through inlet valve 7.

Figure 17:
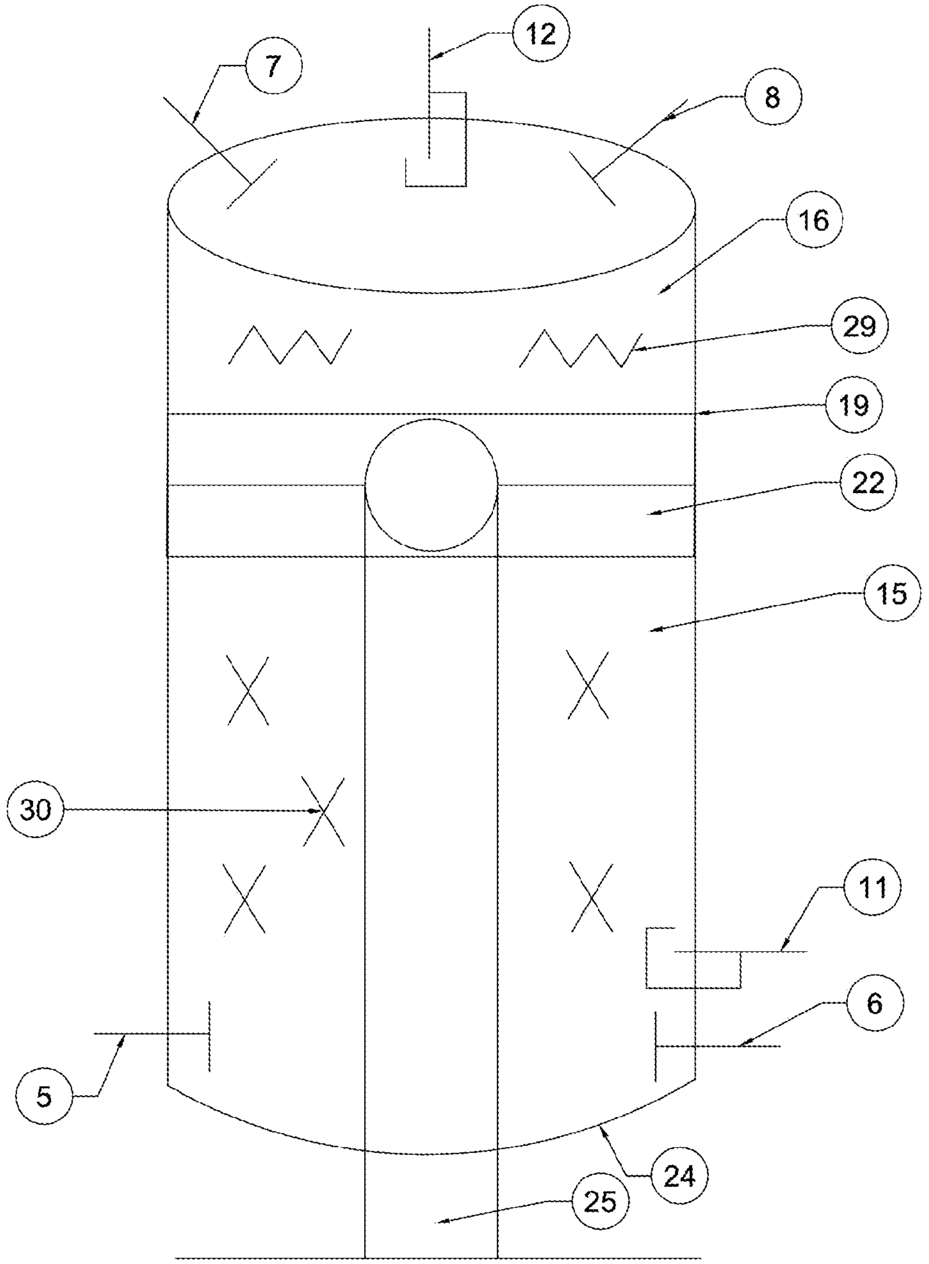

As depicted in FIG. 17, the combustion of compressed air-fuel mixture in Region ‘c’ delivers power stroke and compression stroke to air-fuel mixture in Region ‘d’ and also provides exhaust stroke to Region ‘b’ and intake stroke to Region ‘a’ in Cylinder 1 as shown by FIG. 10.

FIG. 17 shows that the compressed air-fuel mixture in Region ‘c’ 15 combusts to provide power stroke that moved Piston 2 22 to TDC 19 of Region ‘d’ 16 consequently providing compression stroke to compress air-fuel mixture in Region ‘d’ 16. Region ‘c’ 15 houses residue gases 30 due to combustion.

Figure 18:
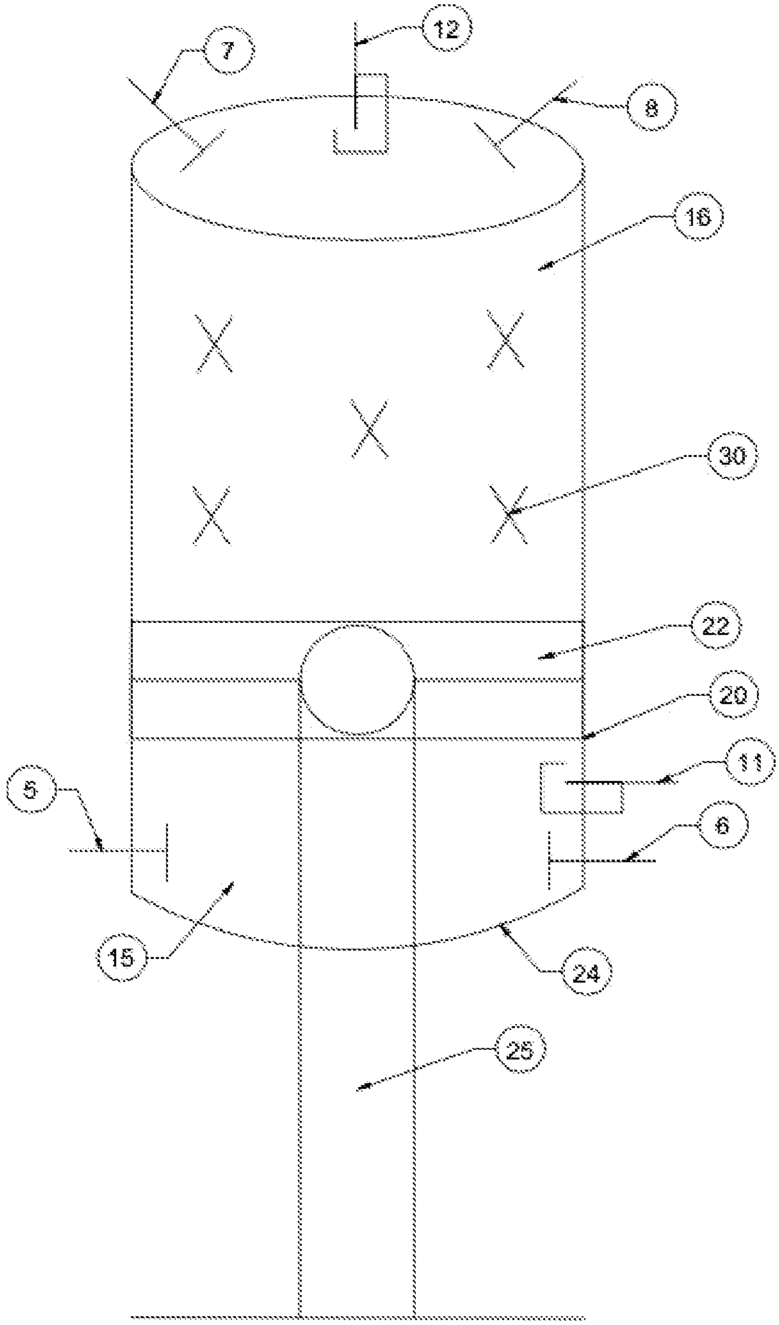

As depicted in FIG. 18, the power stroke delivered by combustion of compressed air-fuel mixture in Region ‘d’ directly provides exhaust stroke to Region ‘c’. This moves Piston 1 in Cylinder 1 to TDC of Region ‘a’ performing compression on the air-fuel mixture in Region ‘a’ supplementing intake stroke to Region ‘b’ same as shown by FIG. 11.

FIG. 18 shows that the compressed air-fuel mixture in Region ‘d’ 16 combusts to provide power stroke that moved Piston 2 22 to BDC 20 of Region ‘d’ 16, purging the exhaust from Region ‘c’ 15. Region ‘d’ 16 at this stage houses exhaust residue 30.

Figure 19:
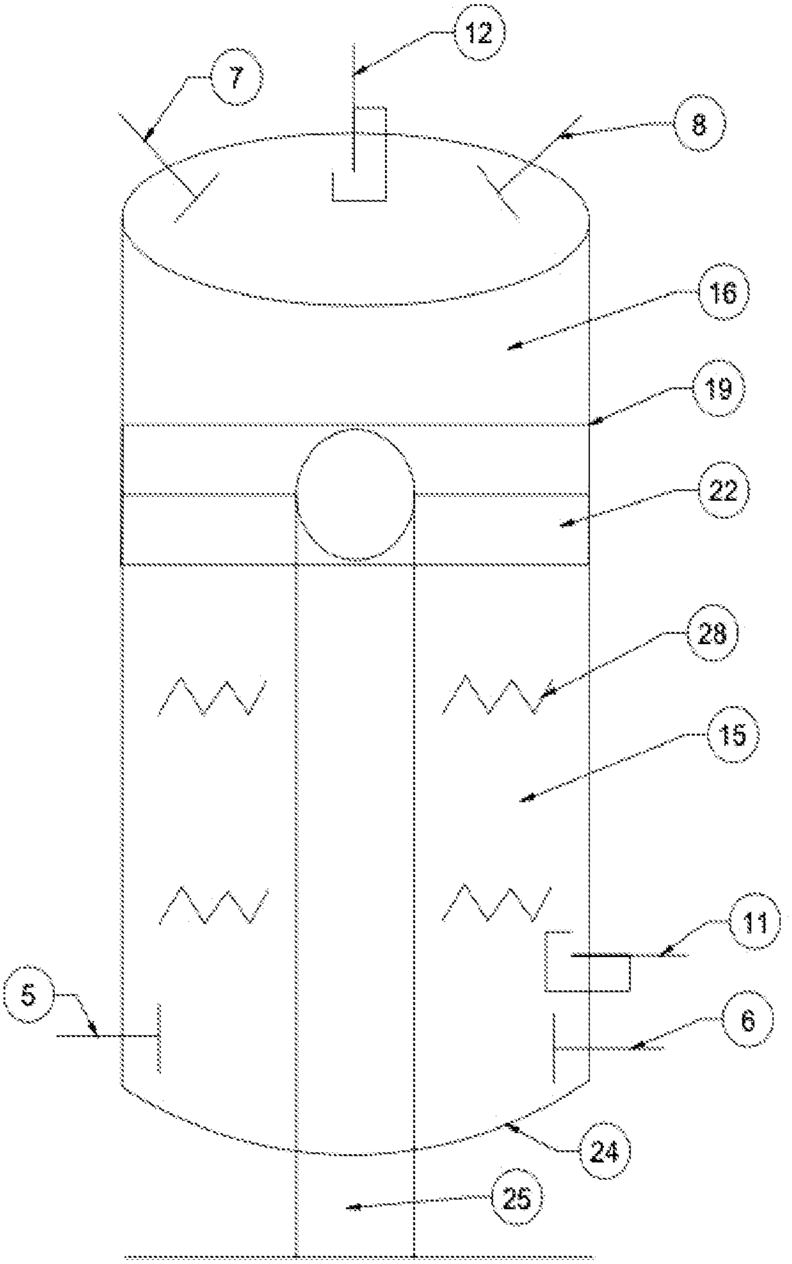

FIG. 19 shows the same initial state of the cylinder as shown in FIG. 15. FIG. 19 shows that Piston 2 22 is at TDC 19 of Region ‘d’ 16 purging the exhaust gases from Region ‘d’ 16 and charging Region ‘c’ 15 with fresh charge of air-fuel mixture.

This describes the basic working of the supplementary cylinder of the inventive engine with the same cycles as of Cylinder 1 and inverse in time parameter obtaining positive net power. To form a continuous power generation cycle in the inventive engine both cylinders with same stated operations acting inversely are introduced.

The piston movement in one cylinder is alternating to the piston movement in the other cylinder i.e., when the piston in one cylinder moves to BDC, the piston in other cylinder moves to TDC.

Working Relation Between Cylinders

The state of Cylinder 1 described in FIG. 12 where power stroke delivered by Region ‘a’ in Cylinder 1 results in intake stroke in Region ‘c’ and exhaust stroke in Region ‘d’ the same state described in FIG. 15 for Cylinder 2.

The state of Cylinder 1 described in FIG. 13 where power stroke delivered by Region ‘b’ in Cylinder 1 results in compression stroke in Region ‘c’ and intake stroke in Region ‘d’, the same state described in FIG. 16 for Cylinder 2.

Figure 20:
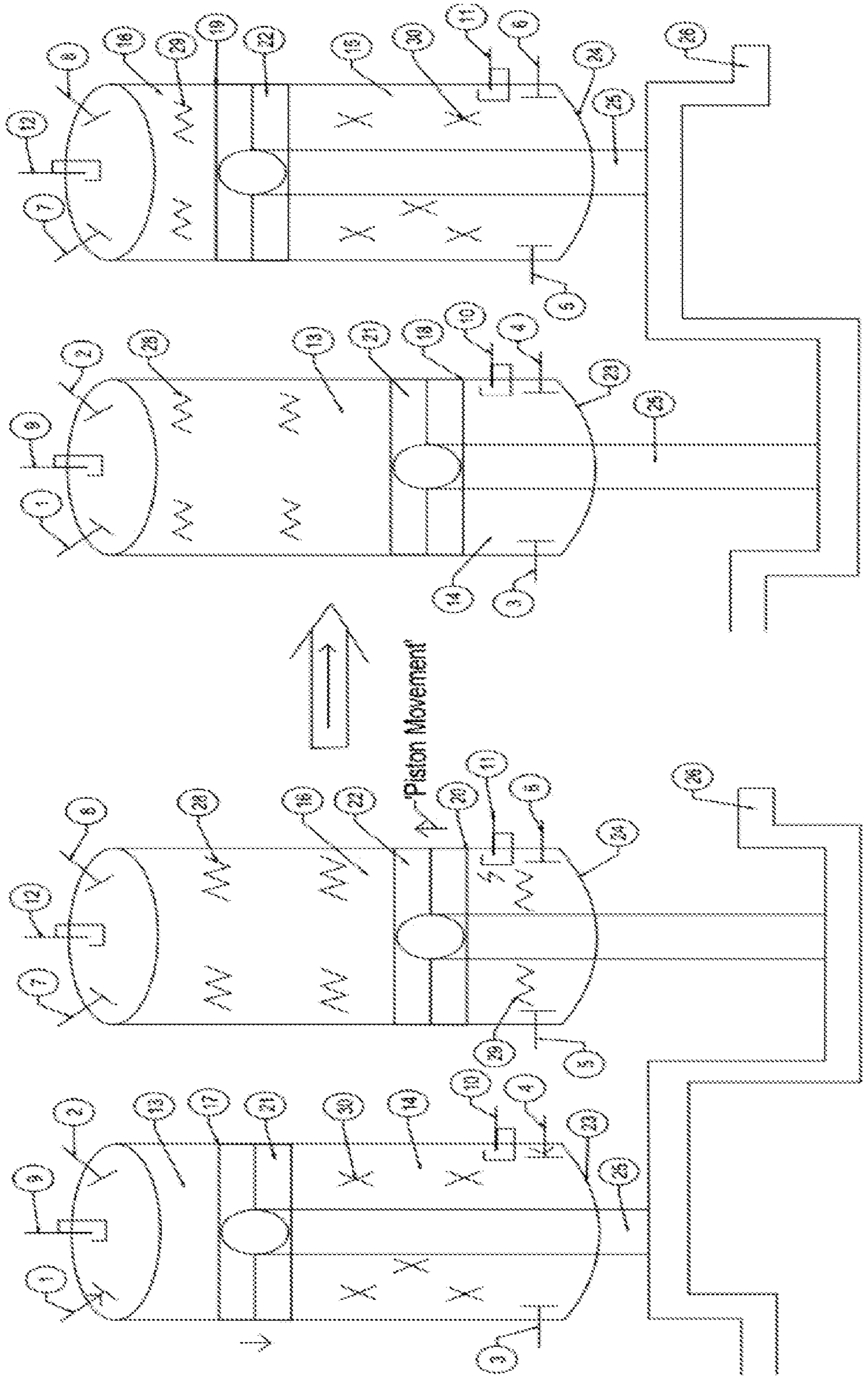
FIG. 20 demonstrates combustion in Region ‘c’ of Cylinder 2 to produce power stroke along with supplementing states in other regions.

As shown in FIG. 20, power stroke due to combustion of compressed air-fuel mixture in Region ‘c’ moved Piston 2 to TDC of Region ‘d’, providing power stroke and simultaneously compression stroke to Region ‘d’. At the same instance Cylinder 1 resulted in the same state shown in FIG. 10 which is exhaust stroke to Region ‘b’ and intake stroke to Region ‘a’.

Figure 21:
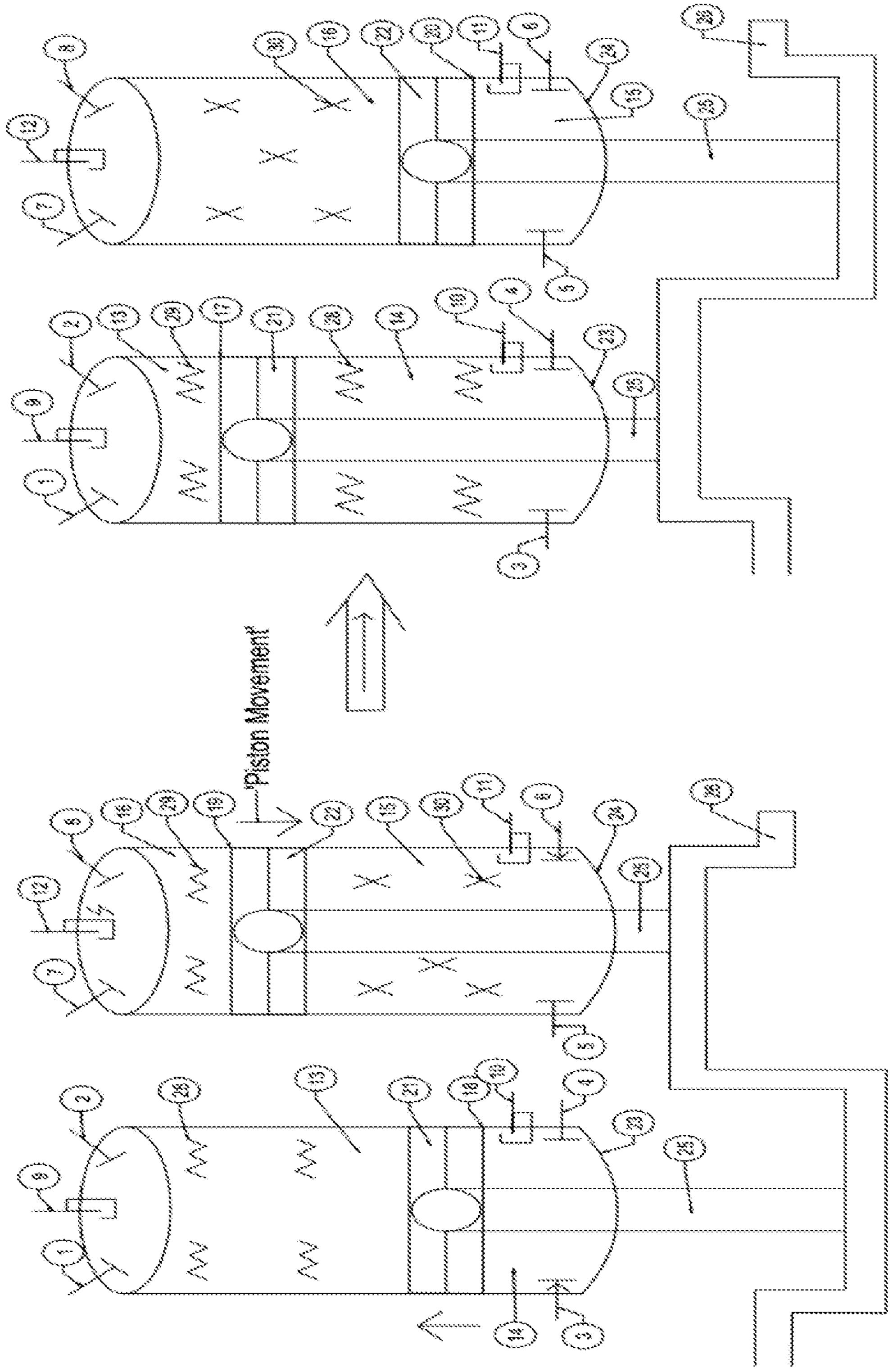
FIG. 21 demonstrates combustion in Region ‘d’ of Cylinder 2 to produce power stroke along with supplementing states in other regions.

As shown in FIG. 21, power stroke in Cylinder 2 due to combustion in Region ‘d’ moved Piston 2 to BDC of Region ‘d’ providing power stroke and simultaneously exhaust stroke to Region ‘c’. At this instance, Cylinder 1 results in the same state shown in FIG. 11, which is compression stroke to Region ‘a’ and intake stroke to Region ‘b’.

Relation Between Cylinders Having Alternating Piston Movement

Cylinder 1 consists of Region ‘a’ and Region ‘b’. Cylinder 2 consists of Region ‘c’ and Region ‘d’.

The power stroke in Region ‘a’ not only provides compression to Region ‘b’ shown by FIG. 12 but also provides intake stroke to the Region ‘c’ in Cylinder 2 as shown in FIG. 15.

Similarly, the power stroke from combustion of air-fuel mixture in Region ‘b’ provides exhaust stroke to Region ‘a’ shown by FIG. 13 and supplements compression stroke to Region ‘c’ and intake stroke to Region ‘d’ shown by FIG. 16.

On the same principle, the power stroke in Region ‘c’ will provide compression stroke to Region ‘d’ shown by FIG. 17 and intake stroke to Region ‘a’ with exhaust stroke to Region ‘b’ shown by FIG. 10. In this way all four regions contribute to the cycle for continuous power delivery to the flywheel.

When Cylinder 1 completes its power strokes, the power strokes of Cylinder 2 supplement the intake/compression stroke of Region ‘a’ and exhaust/intake stroke of Region ‘b’ respectively.

Relation Between Cylinders Having Parallel Piston Movement

In parallel piston movement all cylinders have same geometry with same working at different stages: Region ‘a’ and Region ‘d’ above piston, Region ‘b’ and Region ‘c’ below piston; hence, all cylinders having same BDC and TDC similar to region ‘a’.

Figure 25:
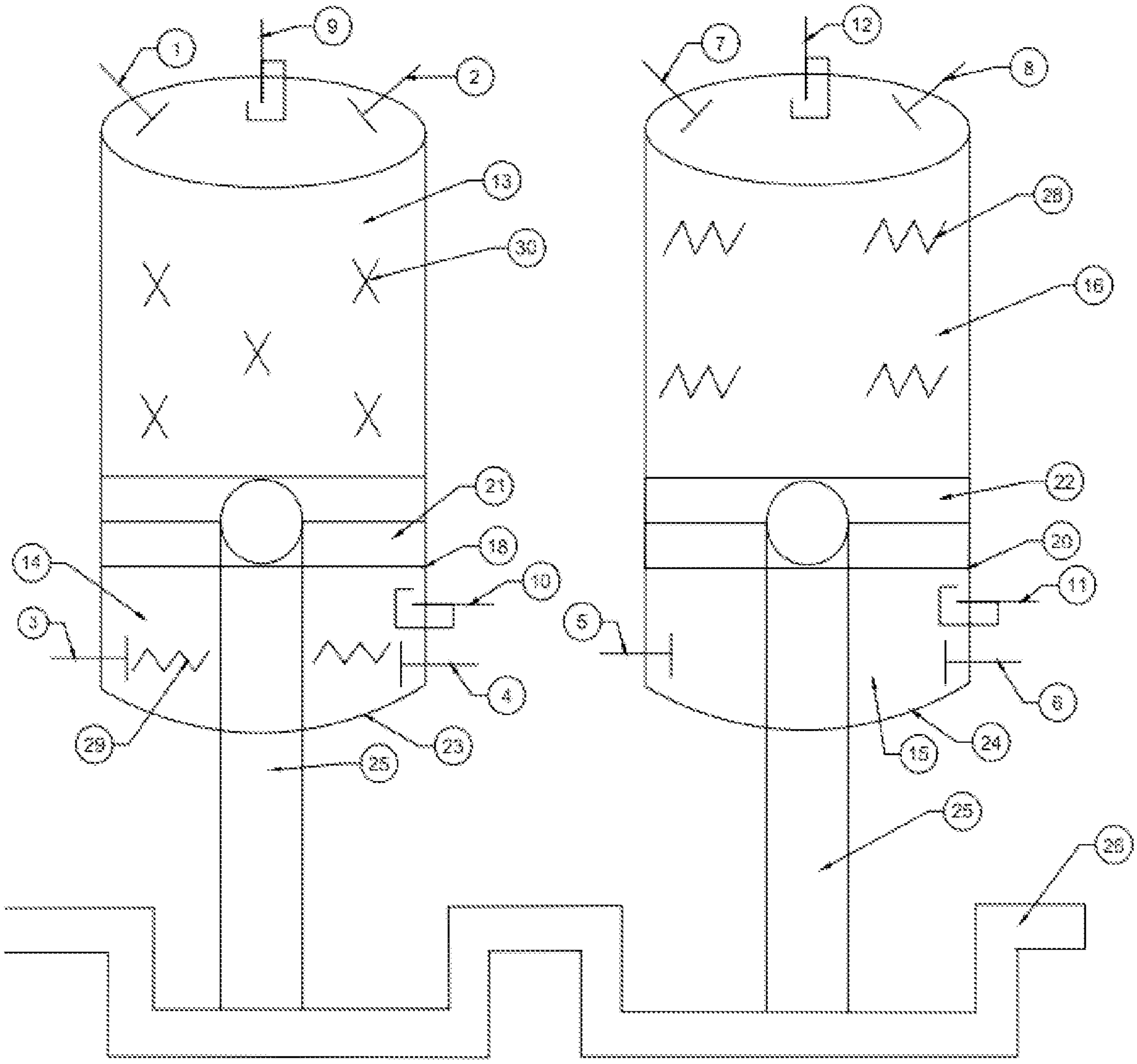
FIG. 25 to FIG. 28 illustrates power strokes delivered by different regions in parallel engine working i.e. both pistons in both cylinders traveling to the same ends of their respective cylinders simultaneously.

The combustion takes place in Region ‘a’ providing power stroke which consequently compress the air-fuel mixture in Region ‘b’ shown by FIG. 25. The piston movement is parallel so in Cylinder 2, Piston 2 provides exhaust stroke to Region ‘c’ and intake stroke to Region ‘d’ same as shown in FIG. 25.

Figure 26:
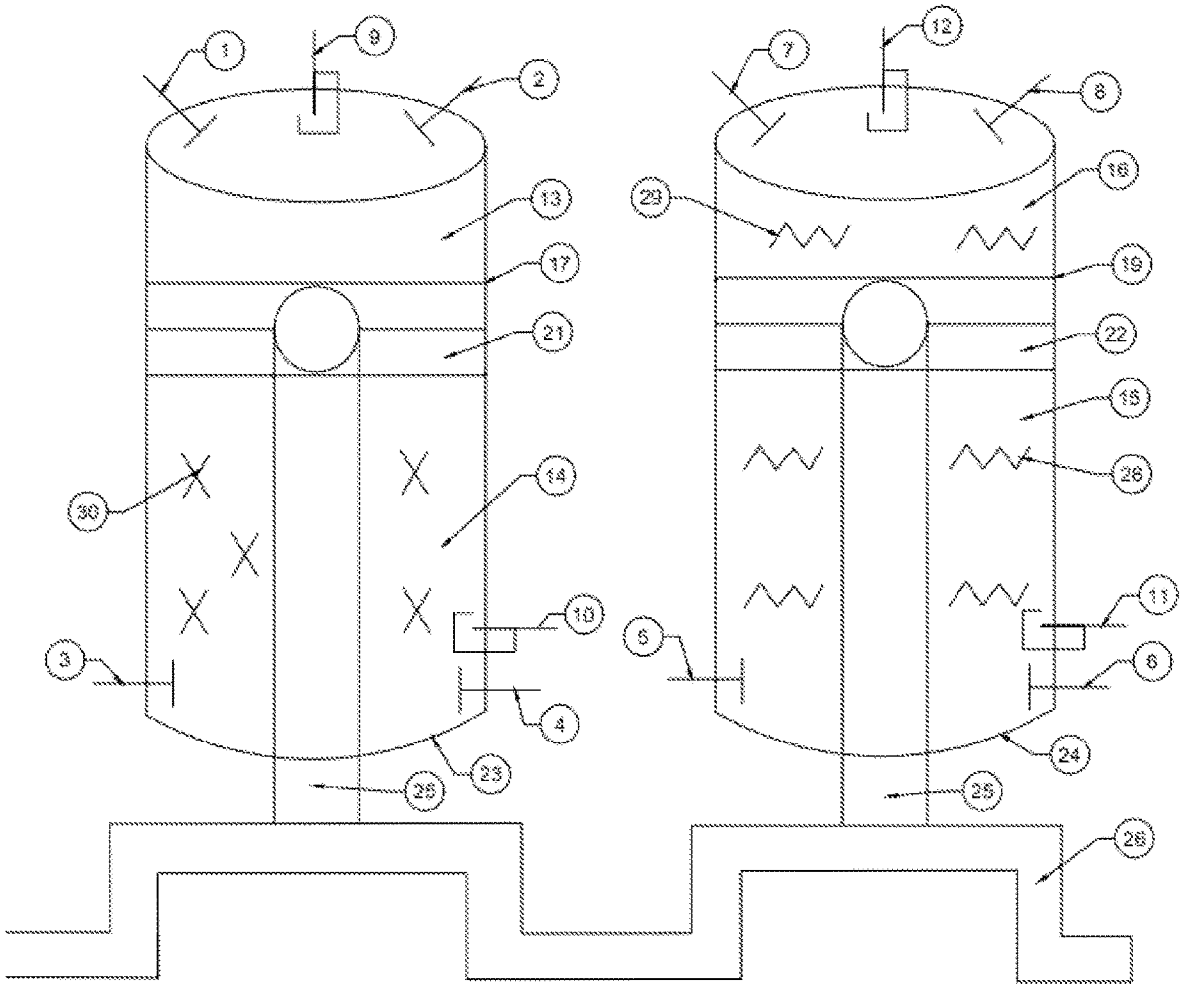

Next, combustion of compressed air-fuel mixture in Region ‘b’ provides power stroke moving piston to TDC of Region ‘a’ shown by FIG. 26. In Cylinder 2 piston movement provides Region ‘d’ with compression stroke and Region ‘c’ with intake stroke same as shown in FIG. 26.

Figure 27:
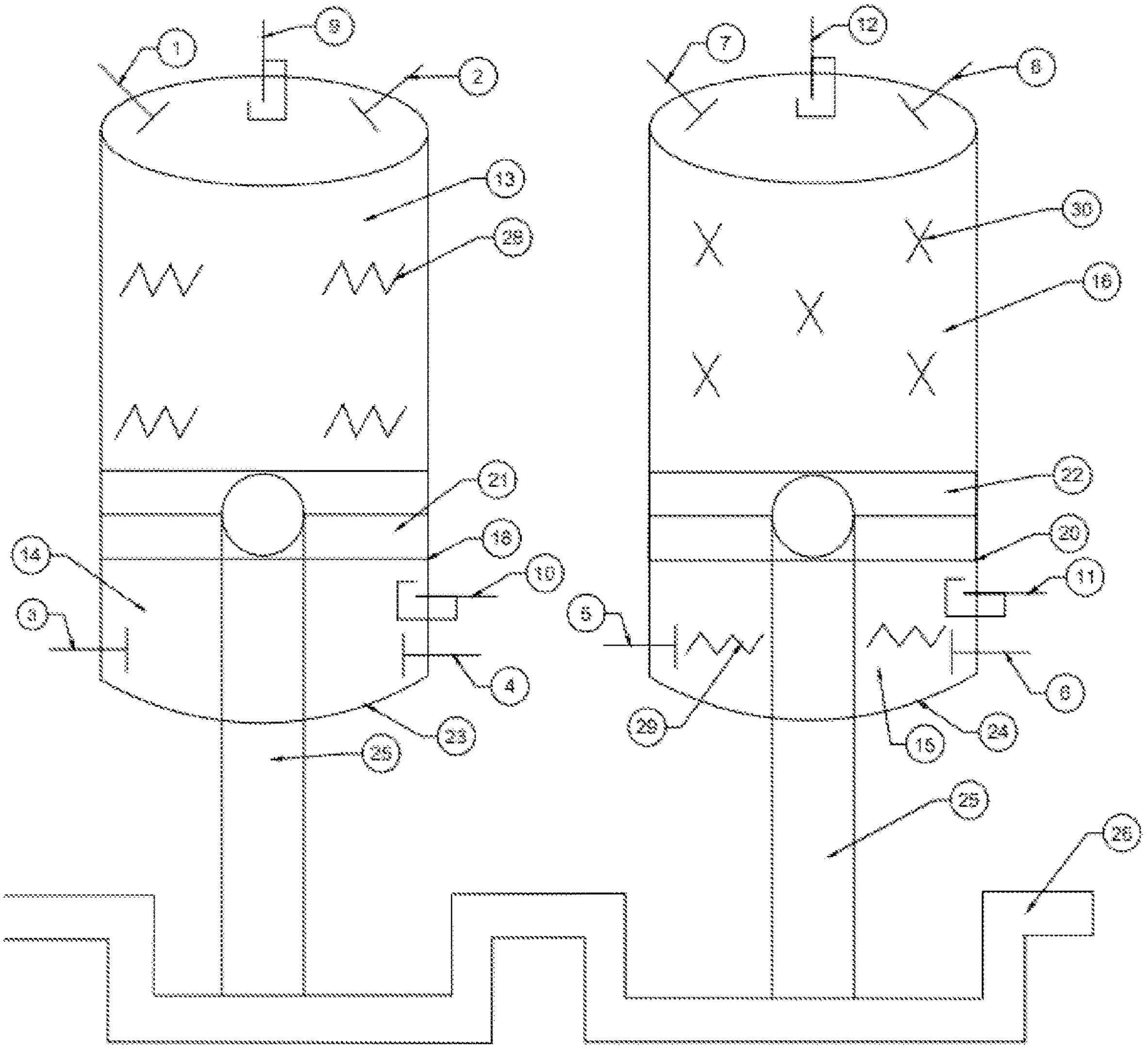

Combustion in Region ‘d’ provides power stroke moving piston to BDC, providing Region ‘c’ with compression stroke same as shown in FIG. 27. In Cylinder 1, piston movement provides Region ‘a’ with intake stroke and Region ‘b’ with exhaust stroke same as shown in FIG. 27.

Figure 28:
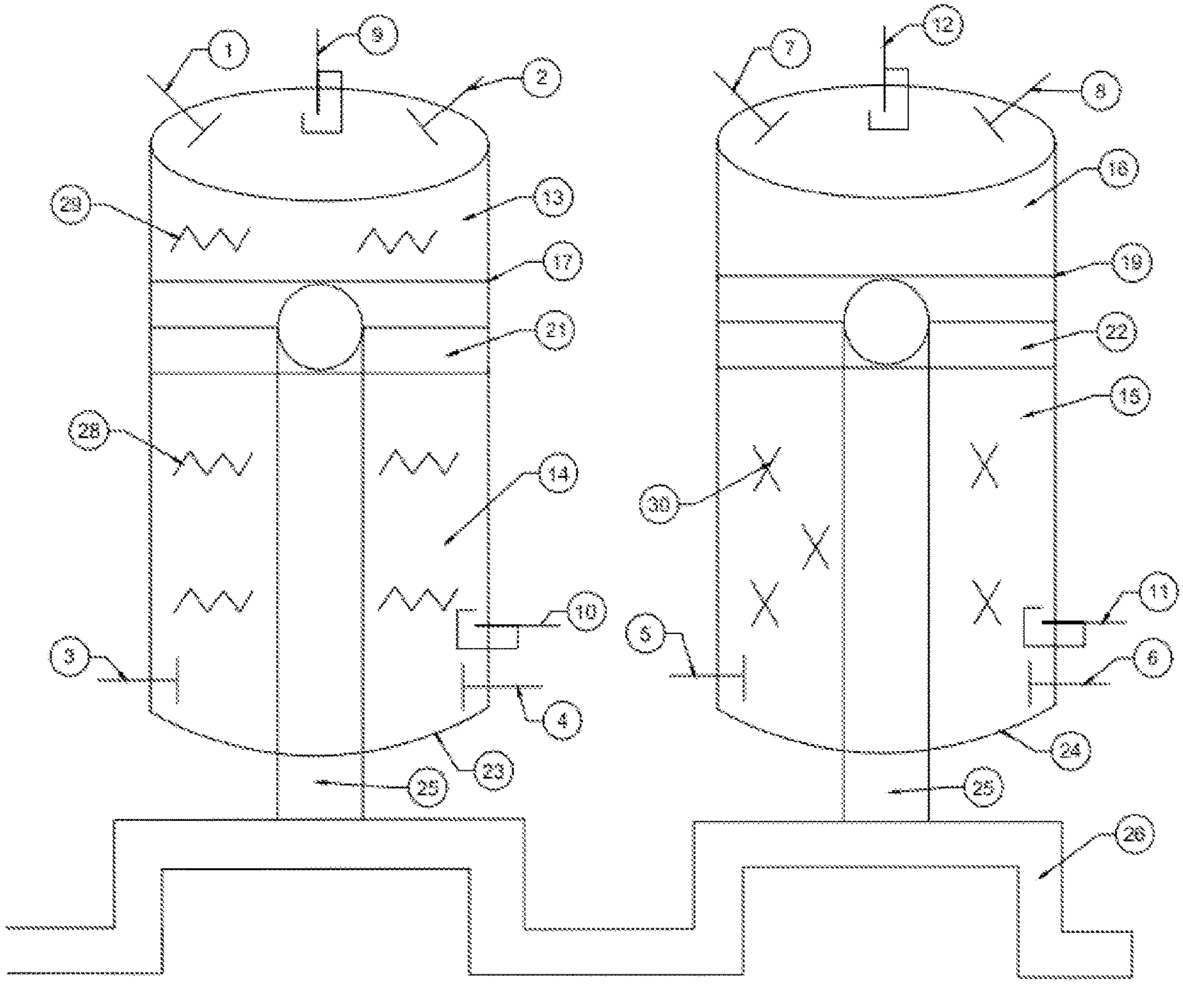

Next, combustion of compressed air-fuel mixture in Region ‘c’ provides power stroke, which moves piston to TDC. The movement of Piston 2 provides exhaust stroke to Region ‘d’ same as shown in FIG. 28 and movement of Piston 1 provides compression stroke to Region ‘a’ and intake stroke to Region ‘b’ same as shown in FIG. 28.

The relation between figures shows that in parallel piston movement, all cylinders have same cycle at different stages for a certain time instance.

Description of Drawings Related to Cylinder 2 Providing Power Strokes and its Relation with Cylinder 1 in Alternating Piston Movement FIG. 20 shows combustion of compressed air-fuel mixture in Region ‘c’ 15 to provide power stroke moving Piston 2 22 to TDC 19 compressing air-fuel mixture in Region ‘d’ 16. Simultaneously, Piston 1 21 moves to BDC 18 of region ‘a’ 13 providing exhaust stroke to region ‘b’ 14 and intake of fresh charge of air-fuel mixture to region ‘a’ 13.

FIG. 21 shows combustion of compressed air-fuel mixture in Region ‘d’ 16 to provide power stroke moving Piston 2 22 to BDC 20 of Region ‘d’ 16 scavenging exhaust residue from Region 'c' 15. Simultaneously, Piston 1 21 moves to TDC 17 of Region 'a' 13 providing compression stroke to air-fuel mixture in Region 'a' 13 and intake stroke for fresh charge of air-fuel mixture in Region 'b' 14.

Cycle Description

Figure 22:
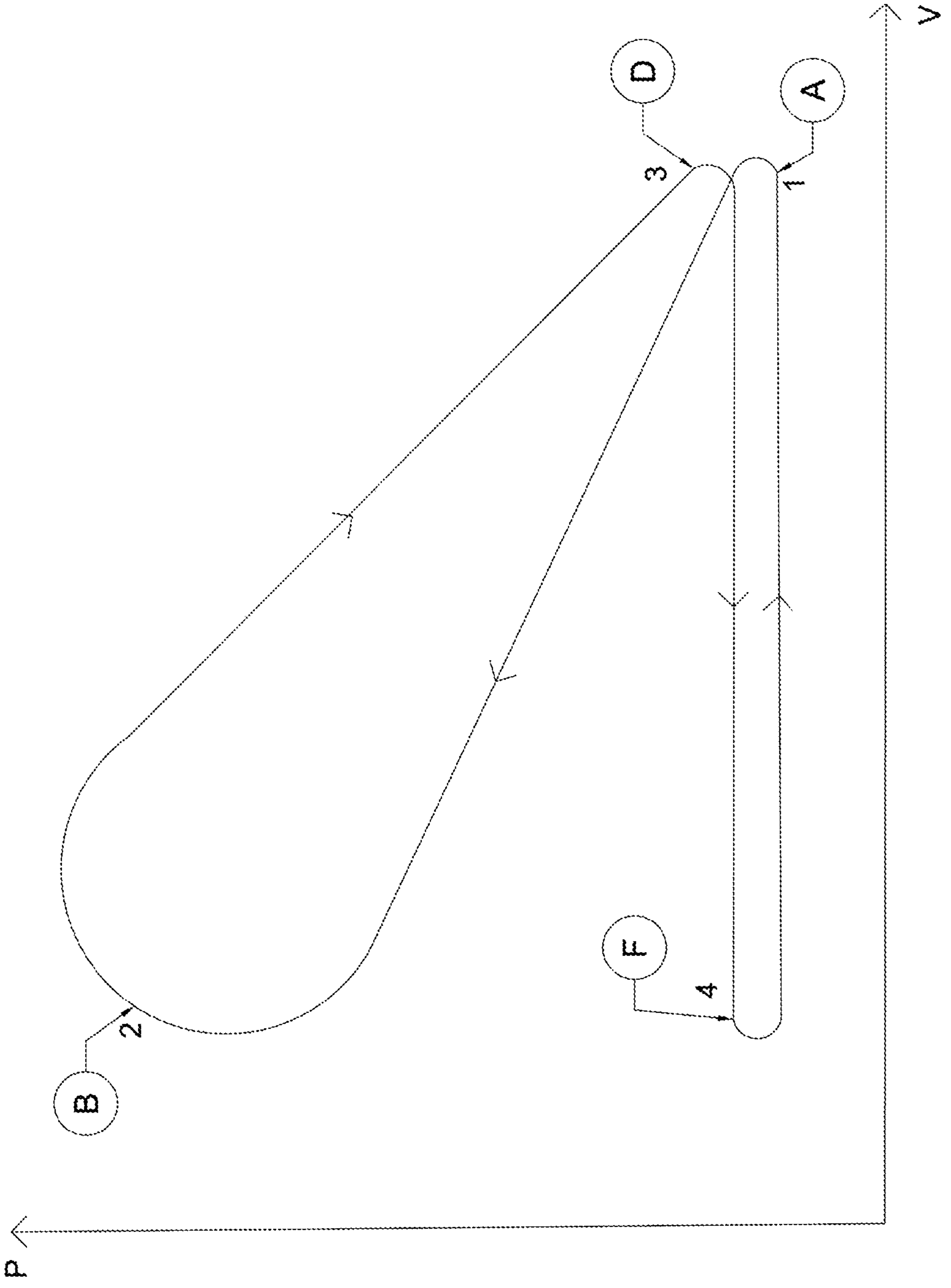
FIG. 22 shows Pressure-Volume (PV) diagram for Region ‘a’ of Cylinder 1 or Region ‘c’ for Cylinder 2 defining processes at different instances.
Figure 23:
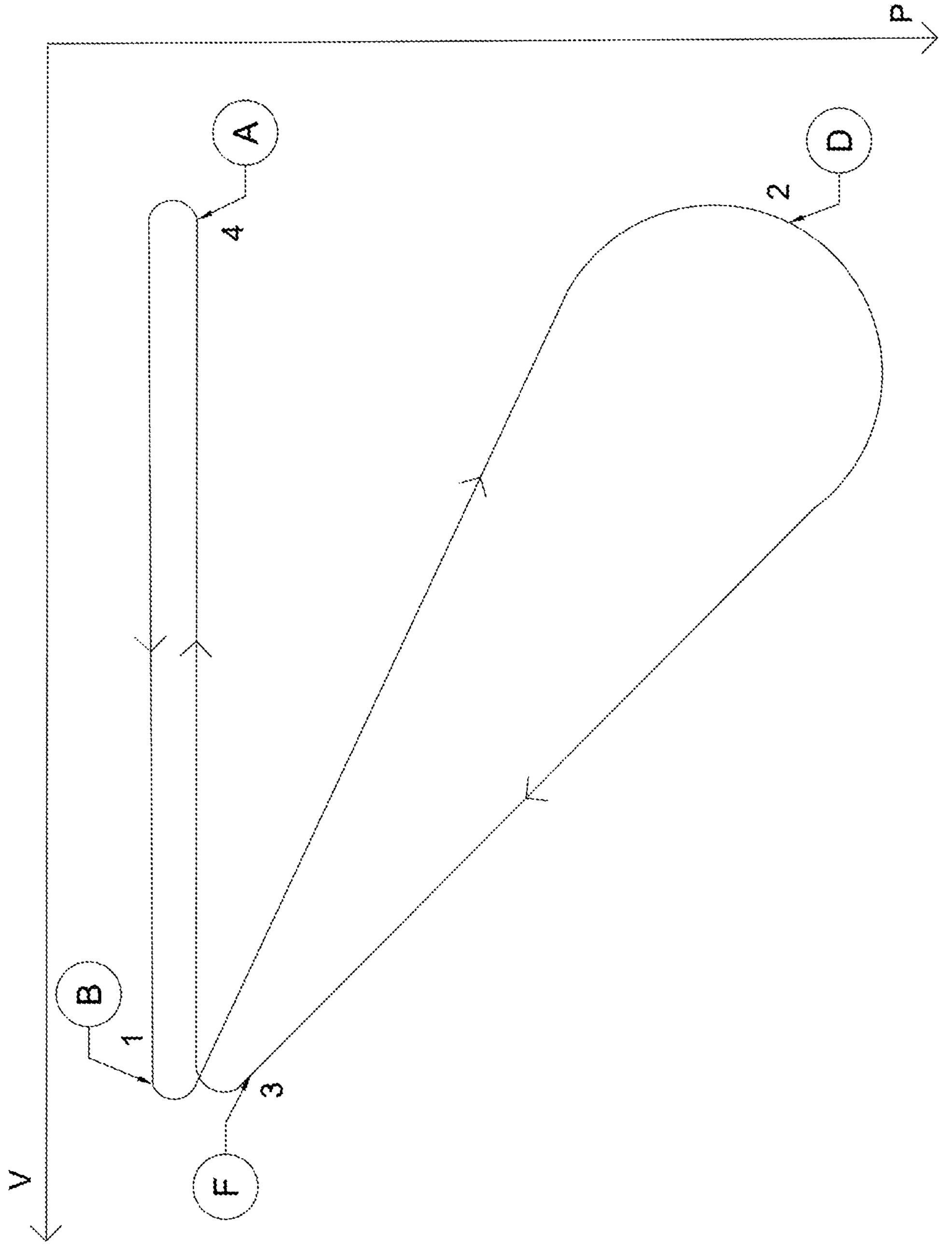
FIG. 23 shows Pressure-Volume (PV) diagram for Region ‘b’ of Cylinder 1 or Region ‘d’ for Cylinder 2 defining processes at different instances.

Using real cycle for Region 'a' in Cylinder 1 or Region 'c' in Cylinder 2 represented by FIG. 22. The inverse of the cycle for the opposite region i.e. Region 'b' or Region 'd' within the same cylinder is represented by FIG. 23.

Each cylinder has two regions for air-fuel mixture combustion/compression. Each cylinder has two cycles that correlate to each other with time parameter. The relation between both cycles and regions develops because of single inventive double sided piston. The inventive piston operates in both regions and cycles.

The cycles operate alternatively in both regions; increase in pressure in one region leads to decrease in pressure in the other region of the same cylinder.

Figure 24:
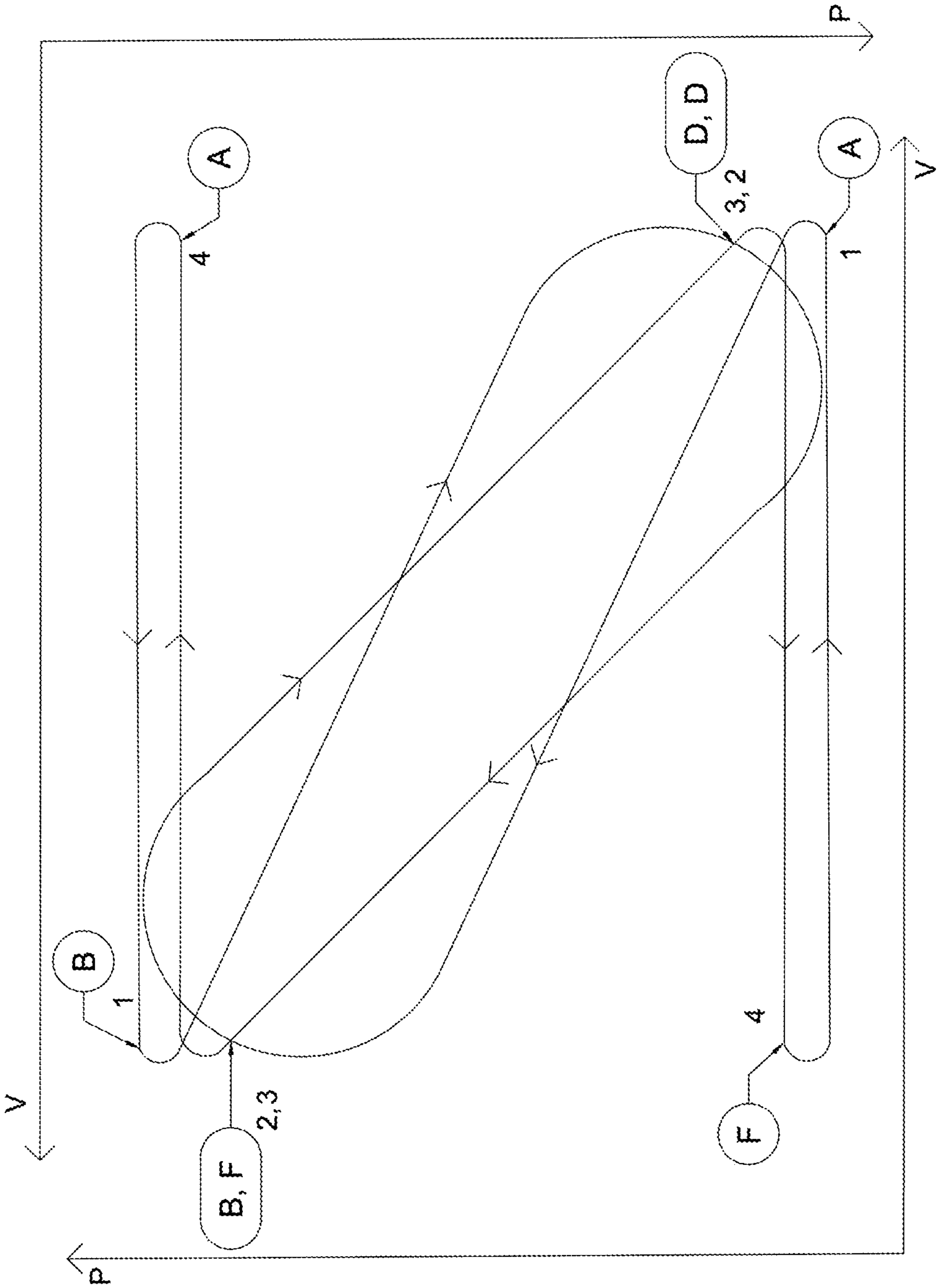
FIG. 24 shows superimposed PV diagrams of both regions within a cylinder demonstrating the processes in both regions of the cylinder at a single instance.

BDC of one region is also the TDC of alternating region. The cycle graph depicted in FIG. 24 shows paths followed in upper and lower region overlapping each other as the cycles operate in a single cylinder. The cycles are inverse to each other because of the stated pressure-volume relation that occurs between the regions.

The inventive design includes two cylinders connected inversely.

The time instances are denoted by alphabets A, B, D and F, representing different time instances and also relating cycle processes in each region at a certain time instance.

The cycles are (cycle of Region 'a'/Region 'c' and cycle of Region 'b'/Region 'd') related to each other represented in time instances, A, B, D and F.

The processes are denoted as 1-2, 2-3, 3-4 and 4-1.

Working of a single cylinder is considered as both cylinders have same working principle varying only in time parameter and instantaneous cycle stage.

Cycle Representation of Region 'a' Through FIG. 22

Intake process is represented by 4-1.

Compression process is represented by 1-2.

Expansion process due to combustion is represented by 2-3.

Exhaust process is represented by 3-4.

At Instance A, Region 'a' is charged with fresh air-fuel mixture.

Process (1-2) of Cycle for Region 'a'

From Instance A to Instance B, process (1-2) represents compression of air-fuel mixture as the piston moves to TDC of Region 'a'.

At Instance B, the heat is added to the cycle through spark ignition. The spark ignites the compressed air-fuel mixture resulting in expansion of gases which move the piston to BDC of Region 'a'.

Process (2-3) of Cycle for Region 'a'

From Instance B to Instance D, process (2-3) represents the power stroke delivered because of expansion of gases in combustion chamber, moving the piston to BDC of Region 'a'. This process leaves exhaust gases as residue.

At Instance D, the exhaust valve opens to purge the exhaust gases as the piston moves to TDC.

Process (3-4) of Cycle for Region 'a'

From Instance D to Instance F, process (3-4) represents the exhaust stroke. As the piston moves to TDC, the exhaust valves open which purges the combustion chamber of exhaust gases.

At Instance F, the exhaust valve in Region 'a' closes and the inlet valves open to allow fresh charge in combustion chamber.

Process (4-1) of cycle for Region 'a'

From Instance F to Instance A, process (4-1) represents the intake stroke. As the piston is moving to BDC of Region 'a', inlet valves open charging combustion chamber with fresh charge of air-fuel mixture.

Cycle Representation of Region 'B' Through FIG. 23

The cycle follows the same processes:

Inlet of air-fuel mixture represented by process (4-1).

Compression of air-fuel mixture represented by process (1-2).

Power stroke due to combustion represented by process (2-3).

Exhaust of residue gases from combustion chamber is represented by process (3-4).

The processes of cycle representing Region 'a' and the cycle representing Region 'b' will be same but will be related in one-step back time instance i.e., if in one region expansion occurs, compression occurs in the other region. Both regions have inlet process (4-1), compression process (1-2), power process (2-3) and exhaust process (3-4). The processes of both regions within a single cylinder are related to each other for a certain time instance.

The cycles overlap in a single graph as both cycles take place in a single cylinder. The cycles are inverse to one another because of the Pressure-Volume relation between them. High pressure in one region means low pressure in other region, as they share the same inventive double-sided piston.

Complete Cycle Description Relating to Time Instances

Relation between cycles of Region 'a'/Region 'c' and Region 'b'/Region 'd' is demonstrated by using the time instances A, B, D and F.

The following explains relation of both cycles for a particular time instance.

Instance A of Cycle

As piston moves to BDC, the cycle in Region 'a' follows intake process path (4-1). Both regions share the inventive double-sided piston so BDC of Region 'a' is also TDC of Region 'b'.

The cycle in Region 'b' follows exhaust process path (3-4) at this instance.

At Instance A, Region 'a' has intake process path (4-1) and Region 'b' has exhaust process path (3-4).

Instance B of Cycle

At Instance B the cycle in Region 'a' will follow a compression process path (1-2), as the inventive double-sided piston moves to TDC of Region 'a', while Region 'b' follows an intake process path (4-1).

Instance D of Cycle

Instance D is one of the prime instance of the cycle. Both Region 'a' and Region 'b' has a common inventive double-sided piston so that the process of one region effects the other region which is clearly visible at this instance.

At Instance D following an expansion process path (2-3) piston moved to BDC of Region 'a'. The piston movement caused by expansion of gases due to combustion. The cycle in Region 'a' follows an expansion process path (2-3) which simultaneously causes Region 'b' to follow compression process path (1-2).

Instance F of Cycles

At Instance F, the cycle in Region 'b' follows an expansion process path (2-3) moving inventive double-sided piston to TDC of Region 'a'. At Instance F, Region 'a' follows an exhaust process path (3-4) and Region 'b' follows an expansion process path (2-3).

The cycle follows the following steps in time instances:

A→B→D→F

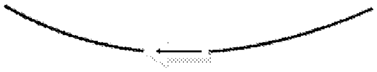

Cycle Relation Between Cylinders

The following table describes the cycle process for Cylinder 1 and Cylinder 2 at different time instances.

Cylinder 2 follows the same cycle as of Cylinder 1 except Region ‘a’ correlates to Region ‘c’ and Region ‘b’ correlates to Region ‘d’.

TABLE FOR CYCLE RELATION BETWEEN CYLINDERS

| Regions | Processes | Figure | Cycle Time Instances |
|---|---|---|---|
| Region ‘a’/Region ‘c’<br>Region ‘b’/Region ‘d’ | Intake<br>Exhaust | FIG. 10/FIG. 15 | Instance A |
| Region ‘a’/Region ‘c’<br>Region ‘b’/Region ‘d’ | Compression<br>Intake | FIG. 11/FIG. 16 | Instance B |
| Region ‘a’/Region ‘c’<br>Region ‘b’/Region ‘d’ | Expansion<br>Compression | FIG. 12/FIG. 17 | Instance D |
| Region ‘a’/Region ‘c’<br>Region ‘b’/Region ‘d’ | Exhaust<br>Expansion | FIG. 13/FIG. 18 | Instance F |

Cycle Relation in Alternating Double-Sided Piston Movement

For alternating movement of inventive double-sided pistons in both cylinders i.e., Cylinder 1 and Cylinder 2, Region ‘a’ directly correlates to Region ‘c’ and Region ‘b’ directly correlates to Region ‘d’.

For same Instance A, Region ‘a’ follows intake process path (4-1) and Region ‘b’ follows exhaust process path (3-4) in Cylinder 1 while in Cylinder 2, Region ‘d’ follows compression process path (1-2) and Region ‘c’ follows an expansion process path (2-3).

In the same way, Region ‘a’ follows expansion process path (2-3) and Region ‘b’ follows compression process path (1-2) in Cylinder 1 while in Cylinder 2 Region ‘d’ follows exhaust process path (3-4) and Region ‘c’ follows intake process path (4-1).

The cycle for each cylinder remains the same.

TABLE FOR ALTERNATING PISTON MOVEMENT

| Regions | Processes | Figure | Cycle Time Instance |
|---|---|---|---|
| Region ‘a’/Region ‘c’<br>Region ‘b’/Region ‘d’ | Intake<br>Exhaust | FIG. 10/FIG. 15 | Instance A |
| Region ‘a’/Region ‘c’<br>Region ‘b’/Region ‘d’ | Expansion<br>Compression | FIG. 12/FIG. 17 | Instance D |

Cycle Relation in Parallel Double-Sided Piston Movement

In this construction TDC and BDC of both cylinders are similarly placed such that when Piston 1 is at TDC of Region ‘a’, Piston 2 is also at TDC of Region ‘d’.

This synchronization correlates Region ‘a’ to Region ‘d’ and Region ‘b’ to Region ‘c’.

In the synchronized parallel double-sided piston movement both cylinders follow the same cycle path respective to time instances.

Cylinder 1 follows compression process path (1-2) for Region ‘a’ and intake process path (4-1) for Region ‘b’ at Instance B while Cylinder 2 follows expansion process path (2-3) for Region ‘c’ and exhaust process path (3-4) for Region ‘d’ at Instance F.

Simultaneously Cylinder 2 follows expansion process path (2-3) for Region ‘c’ and exhaust process path (3-4) for Region ‘d’ at Instance F while Cylinder 1 follows compression process path (1-2) for Region ‘a’ and intake process path (4-1) for Region ‘b’ at Instance B.

TABLE FOR PARALLEL PISTON MOVEMENT

| Regions | Processes | Figure | Cycle Time Instance |
|---|---|---|---|
| Region ‘a’/Region ‘d’<br>Region ‘b’/Region ‘c’ | Compression<br>Intake | FIG. 28 | Instance B |
| Region ‘a’/Region ‘d’<br>Region ‘b’/Region ‘c’ | Exhaust<br>Expansion | FIG. 26 | Instance F |

TABLE

FOR RELATION BETWEEN REGIONS IN ALTERNATING PISTON MOVEMENT

| Relation between regions in Alternating Piston movement when Cylinder 2 is providing power strokes. | | Instance in Cylinder 1 | | Instance in Cylinder 2 | | Relation between regions in Alternating Piston movement when Cylinder 1 is providing power strokes. | | Instance in Cylinder 2 | | Instance in Cylinder 1 | |
|---|---|---|---|---|---|---|---|---|---|---|---|
| Region ‘a’ | Region‘ c’ | Intake | Instance A | Power/ Expansion | Instance D | Region ‘c’ | Region‘ a’ | Intake | Instance A | Power/ Expansion | Instance D |
| Region ‘b’ | Region ‘d’ | Exhaust | | Comp- ression | | Region ‘d’ | Region ‘b’ | Exhaust | | Comp- ression | |
| Relation between regions in Parallel Piston movement | | Instance in Cylinder 1 | | Instance in Cylinder 2 | | Relation between regions in Parallel Piston movement | | Instance in Cylinder 2 | | Instance in Cylinder 1 | |
| Region ‘a’ | Region ‘d’ | Comp- ression | Instance B | Exhaust | Instance F | Region ‘d’ | Region ‘a’ | Comp- ression | Instance B | Exhaust | Instance F |
| Region ‘b’ | Region ‘c’ | Intake | | Power/ Expansion | | Region ‘c’ | Region ‘b’ | Intake | | Power/ Expansion | |

FEATURE LIST

1 Inlet valve of Region 'a'
2 Exhaust valve of Region 'a'
3 Inlet valve of Region 'b'
4 Exhaust valve of Region 'b'
5 Inlet valve of Region 'c'
6 Exhaust valve of Region 'c'
7 Inlet valve of Region 'd'
8 Exhaust valve of Region 'd'
9 Spark plug of Region 'a'
10 Spark plug of Region 'b'
11 Spark plug of Region 'c'
12 Spark plug of Region 'd'
13 Region 'a'
14 Region 'b'
15 Region 'c'
16 Region 'd'
17 Top Dead Center of Region 'a' (TDC)
18 Bottom Dead Center of Region 'a' (BDC)
19 Top Dead Center of Region 'd' (TDC)
20 Bottom Dead Center of Region 'd' (BDC)
21 Piston 1
22 Piston 2
23 Cylinder 1
24 Cylinder 2
25 Connecting Rod
26 Crankshaft
27 Inventive Double-Sided Piston with both surfaces capable of performing operations.
28 Uncompressed Air-Fuel Mixture
29 Compressed Air-Fuel Mixture
30 Exhaust Residue Gases

The invention claimed is:

1. An internal combustion engine consisting of plurality of cylinders, each cylinder containing two multi-purpose regions, a double-sided piston, a connecting rod, an output shaft, wherein the pistons are arranged for reciprocating motion within the cylinders due to combustion of fuel at both sides of the double-sided piston alternately, intake valves at both ends of cylinders, exhaust valves at both ends of cylinders, spark plugs at both ends of cylinders, the pistons being coupled to the output shaft by a coupling such that said reciprocating motion of the double-sided pistons drive rotation of the output shaft, the engine being designed such that when measured against a conventional crankshaft engine of identical bore and stroke in a cylinder the top dead centre of one of the two regions is also the bottom dead centre of the other region of the same cylinder, wherein the movement of all pistons are in sync as to plurality of double sided pistons reach to the same ends of their respective cylinders simultaneously.

2. An engine as claimed in claim 1 wherein the cylinders have double-sided piston arrangement where double-sided piston in all cylinders move simultaneously towards the same ends of their respective cylinders.

3. An internal combustion engine as claimed in claim 1 wherein the power stroke in upper region of the cylinder supplements the compression stroke in lower region of the same cylinder, supplementing intake stroke in upper region of the other cylinder and exhaust stroke in lower region of the other cylinder.

4. An engine as claimed in claim 1, wherein the power stroke in lower region of the cylinder supplements the exhaust stroke in the upper region of the cylinder also supplementing the compression stroke in upper region of the other cylinder and intake stroke in lower region of the other cylinder.

5. An internal combustion engine as claimed in claim 1 wherein the power stroke in the upper region of the other cylinder supplements compression stroke in the lower region of the same cylinder and supplementing exhaust stroke in lower region of the main cylinder and intake stroke in the upper region of main cylinder.

6. An internal combustion engine as claimed in claim 1 wherein the power stroke in the lower region of the other cylinder supplements exhaust stroke in the upper region of the same cylinder and supplementing compression stroke in upper region of the main cylinder and intake stroke in the lower region of that cylinder, completing the cycle whereby double-sided pistons are moving simultaneously along the same axis and leading to initial condition of the engine working.

7. An engine working as claimed in claim 4 wherein the engine works inversely, i.e., power stroke in lower region cylinder used to deliver power to crankshaft while supplementing compression stroke in upper region of the same cylinder, also supplementing intake stroke in lower region of the other cylinder and exhaust stroke in upper region of the other cylinder.

8. An engine working as claimed in claim 5 wherein the engine works inversely, i.e., power stroke in upper region of the main cylinder used to deliver power to crankshaft while supplementing exhaust stroke in lower region of the same cylinder, also supplementing intake stroke in upper region of the other cylinder and compression stroke in lower region of the other cylinder.

9. An engine working as claimed in claim 6 wherein the engine works inversely, i.e., power stroke in lower region of the other cylinder delivers power to crankshaft while supplementing compression stroke in upper region of the same cylinder, also supplementing intake stroke in lower region of the main cylinder and exhaust stroke in upper region of the main cylinder.

10. An engine working as claimed in claim 7 wherein the engine works inversely, i.e., power stroke in upper region of the other cylinder delivers power to crankshaft while supplementing exhaust stroke in lower region of the same cylinder, also supplementing intake stroke in upper region of the main cylinder and compression stroke in lower region of the main cylinder.

11. An engine as claimed in claim 1 can be used by inverting, i.e., inter-changing main cylinder with the supplementary cylinder to deliver power to crankshaft.

12. An engine as claimed in claim 1, wherein the engine includes plurality of cylinders oriented with respect to each other as desired.

* * * * *